US008627338B2

(12) United States Patent
Lee et al.

(10) Patent No.: US 8,627,338 B2
(45) Date of Patent: Jan. 7, 2014

(54) RIGHTS OBJECT ACQUISITION METHOD OF MOBILE TERMINAL IN DIGITAL RIGHT MANAGEMENT SYSTEM

(75) Inventors: Kyung Keun Lee, Daegu Metropolitan (KR); Byung Rae Lee, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 1477 days.

(21) Appl. No.: 12/014,148

(22) Filed: Jan. 15, 2008

(65) Prior Publication Data

US 2008/0172678 A1    Jul. 17, 2008

(30) Foreign Application Priority Data

Jan. 15, 2007  (KR) .................. 10-2007-0004166
May 11, 2007  (KR) .................. 10-2007-0046076
Jun. 9, 2007   (KR) .................. 10-2007-0056394

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................... 719/315; 719/313; 719/318

(58) Field of Classification Search
None
See application file for complete search history.

(56) References Cited

U.S. PATENT DOCUMENTS

| 2002/0156737 A1* | 10/2002 | Kahn et al. .................... 705/51 |
| 2004/0068487 A1* | 4/2004 | Barton et al. .................... 707/3 |
| 2005/0091508 A1* | 4/2005 | Lee et al. .................... 713/182 |
| 2005/0216419 A1 | 9/2005 | Lee et al. |
| 2005/0268098 A1 | 12/2005 | Oh et al. |
| 2006/0006220 A1 | 1/2006 | Kwon et al. |
| 2006/0031164 A1* | 2/2006 | Kim .................... 705/51 |
| 2006/0053079 A1 | 3/2006 | Edmonson et al. |
| 2006/0080259 A1* | 4/2006 | Wajs .................... 705/51 |
| 2007/0016532 A1* | 1/2007 | Zhang et al. .................... 705/59 |
| 2007/0168293 A1* | 7/2007 | Medvinsky .................... 705/57 |
| 2009/0217036 A1* | 8/2009 | Irwin et al. .................... 713/168 |

FOREIGN PATENT DOCUMENTS

| EP | 1 496 642 | 1/2005 | ............. H04L 9/08 |
| JP | 2006-65641 | 3/2006 | ............. G06F 21/00 |
| KR | 2005-39523 | 4/2005 | ............. G06F 15/00 |
| WO | WO 2004/003810 | 1/2004 | ............. G06F 17/60 |
| WO | WO 2005/119677 | 12/2005 | ............. G11B 20/10 |
| WO | WO 2007055539 A1 * | 5/2007 | |

OTHER PUBLICATIONS

DRM Architecture Draft Version 2.0, Mar. 15, 2004, Open Mobile Alliance, p. 1, 2, 18 and 19.*

* cited by examiner

*Primary Examiner* — H S Sough
*Assistant Examiner* — Craig Dorais
(74) *Attorney, Agent, or Firm* — Cha & Reiter, LLC

(57) ABSTRACT

A rights objects acquisition method of a mobile terminal in a digital right management system is provided for acquiring multiple rights objects in a composite manner. An objects right acquisition method of a mobile terminal may include generating, in response to a group rights object (RO) acquisition command, a group rights object acquisition request with content identifiers assigned to individual contents corresponding to the rights objects indicated by the group rights object acquisition command, sending the group rights object acquisition request to a rights issuer; and receiving an group rights object acquisition response containing rights object identifiers assigned to the rights objects from the rights issuer. The present invention streamlines the RO acquisition process, especially when acquiring multiple ROs.

50 Claims, 14 Drawing Sheets

| SERIAL NO. | CONENT NAME | REMAINING CONSTRAINT | OTHER |
|---|---|---|---|
| 001 | BOA MUSIC VIDEO | 2 TIMES | wmv |
| 002 | 007 FILM | 1 DAY | mpeg 4 |
| 003 | STATUE OF LIBERTY | 3 TIMES | jpg |
| ⋮ | ⋮ | ⋮ | ⋮ |

_US 8,627,338 B2_

RIGHTS OBJECT ACQUISITION METHOD OF MOBILE TERMINAL IN DIGITAL RIGHT MANAGEMENT SYSTEM

CLAIM OF PRIORITY

This application claims the benefit of priority under 35 U.S.C. §119(a) from the following Korean Patent Applications filed in the Korean Intellectual Property Office: (1) Serial No. 2007-0004166 filed on Jan. 15, 2007; (2) Serial no. 2007-0046076 filed on May 11, 2007; and (3) Serial no. 2007-0056394 filed on Jun. 9, 2007, the entire contents of each aforementioned disclosure are hereby incorporated by reference in their entirety.

BACKGROUND OF THE INVENTION

1. Field of the Invention

The present invention relates to a digital right management (DRM) system. More particularly, the present invention relates to a rights objects acquisition method of a mobile terminal in a digital right management system that is capable of delivering multiple rights objects to a mobile terminal simultaneously.

2. Description of the Related Art

With the recent tendency toward digital convergence, mobile terminals are evolving into multifunctional devices. For example, the functionality of mobile terminals now may include capabilities such as MP3 players and digital broadcast players by incorporating MP3 and digital broadcast tuner modules. Such multimedia-enabled mobile terminals may also support various multimedia services, such as wireless Internet access, online games, Music On Demand (MOD), and Video On Demand (VOD). The ongoing diversification of the mobile services and the terminal capabilities continue to expand the utilizations of mobile terminals. The mobile content business has also expanded to include enabling the provision of various types of mobile contents including ringtones, motion pictures, music files, and games, many of which are valuable copyrighted materials. Since these mobile contents are typically delivered to end users as pay contents, there is a need to protect the contents from theft and prying eyes.

Digital Rights Management (DRM) now plays an ever-increasing role to protect the pay contents from mobile terminal service providers and used in mobile terminals from piracy and illegal copying. DRM is specifically provides a controlled consumption of digital contents, such as documents, audio files including voice and music files and ring tones, video files, and games to protect the intellectual property right of the authors and the content providers.

Although DRM content object can be freely downloaded, it is useless to a user without a usage right, because without the corresponding Rights Object (RO), the material cannot be accessed since the DRM content objects are encrypted with a specific license key.

The RO is a container used in the Open Mobile Alliance (OMA) DRM system, which is an open DRM standard invented by the Open Mobile Alliance, for carrying the license key to decrypt the corresponding DRM object. The RO is issued by a Right Issuer (RI) and purchased by the end user. Since the digital content and corresponding RO are delivered in a detached manner (typically separately), the usage of the downloaded content is restricted to the user acquiring the corresponding RO. The RO is a collection of Permission, Constraints, and other attributes that define under what circumstances access is granted to a particular user, and what usages are defined for, DRM content object. Typically, the usage constraints include Count, DateTime, Interval, Timed-Count, Accumulated, and Individual. The constraints are stored in a specific field of the RO.

For example, the RO may specify the usage for an MP3 file with the count constraint value set to "10". In this case, the MP3 file can be played 10 times and the count is decremented by 1 each time the MP3 file is played. If the count reaches "0", the usage right on the MP3 file is exhausted. In order to maintain the usage right on the MP3 file, the corresponding RO should be updated.

FIGS. 1a and 1b are diagrams illustrating RO delivery procedures in conventional OMA DRM systems.

In FIGS. 1a and 1b, a mobile terminal 101 transmits a content request message (105) to content server 102, and the content server 102 transmits a corresponding content in response to the content request message 106. In a case where the requested content is a DRM protected content, the content is encrypted with an encryption key and with a scheme specified by the DRM, and transmitted in a DRM format having the constraints (e.g., usage rule, the number of times to be played, and duration). If a user request for acquiring the license for the downloaded content is detected, the mobile terminal 101 transmits a license request message 107 to a Right Issuer (RI) 103, and the RI 103 transmits the corresponding license 108 to the mobile terminal 101 in response to the license request message. Here, the license is a usage right on the content which includes a decryption key and usage constraint information. In the case of a DRM content object, the mobile terminal 101 should acquire the usage right for consuming the content. Accordingly, the RI 103 checks whether the identity of the user of the mobile terminal 101 is valid. If it is determined that the user is valid, the RI 103 transmits the license to the mobile terminal 101. If the license is received from the RI 103, the mobile terminal 101 is capable of playing/accessing the content by using the license. Typically, the decryption key and usage constraint information are extracted from the license by a DRM client application installed in the mobile terminal 101. The content is decrypted by using the decryption key and played under the usage constraints specified in the license.

FIG. 1a shows an OMA DRM version 1.0 system in which the DRM RO containing a non-encrypted content encryption key (CEK) is delivered from the RI server 103 to the mobile terminal 101. In the OMA DRM version 1.0 system, there are serious shortcomings in that the content can be acquired and distributed by an unauthorized user who obtained the DRM Content Format (DCF) and RO (i.e., the license of the corresponding DRM content), simultaneously.

FIG. 1b shows an OMA DRM version 2.0 system in which an authentication authority 104 (for example, Content Management Licensing Administrator: CMLA) is introduced. The CMLA 104 transfers the content encryption keys CEK 109 and 110, which are encrypted with a public key, to the mobile terminal 101 and the RI 103, respectively, and the RI 103 transfers the RO contained the encrypted CEK to the mobile terminal 101. Accordingly, in the OMA DRM version 2.0 system, the content can be decrypted only in the mobile terminal 101 having the CEK, resulting in reinforcement of usage right protection.

In the conventional OMA DRM version 2.0 system, however, each content is individually protected by one RO, whereby the RO acquisition process, especially when acquiring multiple ROs, is laborious and time-consuming. For example, extending the validity of a number of ROs for expired MP3, video, and game files requires multiple RO purchasing processes, resulting a great degree of user inconvenience. Thus, there is a need in the art for a more user convenient method that provides effective protection of content.

SUMMARY OF THE INVENTION

The present invention has been made in part to solve at least some of the above problems and to provide at least some of the advantages discussed herein below. The present invention provides an RO acquisition method and apparatus that is capable of acquiring multiple ROs in a composite manner.

Also, the present invention also provides an RO acquisition method and apparatus that is capable of increasing benefits both to consumers and DRM content providers, as well as improving user convenience by simplifying the RO acquisition process.

Also, the present invention provides an RO acquisition method and apparatus that is capable of improving the efficiency of a DRM system by simplifying the RO acquisition process in a composite manner.

In accordance with an exemplary aspect of the present invention, the rights object acquisition method of mobile terminal includes generating, in response to a group rights object acquisition command, a group rights object acquisition request with content identifiers assigned to individual contents corresponding to the rights objects indicated by the group rights object acquisition command; sending the group rights object acquisition request to a rights issuer; and receiving a group rights object acquisition response containing rights object identifiers assigned to the rights objects from the rights issuer.

In accordance with another exemplary aspect of the present invention, a rights object acquisition method of a mobile terminal includes transmitting a rights object acquisition protocol (ROAP) trigger request referencing multiple contents to a rights issuer; receiving an ROAP trigger from the rights issuer in response to the ROAP trigger request; transmitting a rights object (RO) request referencing at least one content to the rights issuer after receiving the ROAP trigger; receiving an RO response from the rights issuer in response to the RO request; and acquiring at least one RO corresponding to the at least one content from the RO response.

In accordance with yet another exemplary aspect of the present invention, a rights object acquisition method in a digital rights management system includes transmitting, in response to a multiple rights object (RO) acquisition command, rights object acquisition (ROAP) trigger request referencing content identifiers (CIDs) assigned to multiple DRM contents to a rights issuer (RI); receiving an ROAP trigger referencing RO identifiers (roIDs) assigned to the ROs corresponding the DRM contents from the RI in response to the ROAP trigger request; transmitting an RO request referencing at least one DRM content selected by a user to the RI after receiving the ROAP trigger; receiving an RO response containing at least one RO corresponding to the at least one DRM content from the RI; and acquiring the at least one RO for the at least one DRM content from the RO response.

In accordance with still another exemplary aspect of the present invention, a rights object acquisition method of a mobile terminal in a digital rights management (DRM) system includes generating, in response to a group rights object acquisition command, a rights object acquisition protocol (ROAP) trigger request; checking a common header of a DRM content format (DCF) containing at least one DRM content; selecting a right issuer (RI) for acquiring rights objects (ROs) corresponding to at least one DRM content with reference to the common header; and transmitting the ROAP trigger request to the IR.

In accordance with still another exemplary aspect of the present invention, a rights object acquisition method for a digital rights management (DRM) system including a rights issuer (RI) issuing rights objects (ROs) to a mobile terminal includes receiving, at the RI, a rights object acquisition protocol (ROAP) trigger request referencing a plurality of content identifiers (CIDs) assigned to a plurality of contents from the mobile terminal; generating ROAP trigger referencing a plurality of rights object identifiers (roIDs) assigned to the ROs corresponding to the contents; and transmitting the ROAP trigger to the mobile terminal.

In accordance with another exemplary aspect of the present invention, a rights object acquisition method of a mobile terminal includes generating, in response to a group rights object acquisition command, a rights object acquisition protocol (ROAP) trigger request referencing a plurality of contents identifiers (CIDs) assigned to a plurality of contents indicated by the group rights object acquisition command; transmitting the ROAP trigger request to a rights issuer (RI) located by common uniform resource locator (BatchRIURL) headers of the contents; receiving an ROAP trigger referencing a plurality of rights object identifiers (roIDs) assigned to rights objects corresponding to the contents from the RI; and acquiring at Least one RO corresponding to at least one content with reference to the roIDs in a composite manner

BRIEF DESCRIPTION OF THE DRAWINGS

The above and other objects, features and advantages of the present invention will be more apparent from the following detailed description in conjunction with the accompanying drawings, in which:

FIG. 5 is a flowchart illustrating an example of a DRM content object list generation procedure of the rights object acquisition method of FIG. 3a;

FIG. 11a is an example of a screen image illustrating a step of displaying the DRM content list in FIG. 4;

FIG. 11b is a diagram illustrating an exemplary information field structure of a DRM content list of FIG. 11a;

DETAILED DESCRIPTION

Exemplary embodiments of the present invention are described with reference to the accompanying drawings in detail. It is to be understood that the drawings and examples discussed herein have been provided for illustrative purposes only, and the present invention is not limited to the illustrative examples provided herein. The same reference numbers are used throughout the drawings to refer to the same or like parts. For the purposes of clarity and simplicity, detailed descriptions of well-known functions and structures incorporated herein may be omitted to avoid obscuring appreciation of the subject matter of the present invention by a person of ordinary skill in the art.

Table 1 comprises a list of abbreviations used in the following exemplary detailed descriptions of the present invention.

TABLE 1

| | |
|---|---|
| OMA | Open Mobile Alliance |
| DRM | Digital Right Management |
| DCF | DRM Content Format |
| RO | Right Object (=License) |
| ROAP | Right Object Acquisition Protocol |
| FL | Forward Lock |
| CD | Combined Delivery |
| SD | Separate Delivery |
| CEK | Content Encryption Key |
| RI | Right Issuer |
| CI | Content Issuer (=Content Server) |
| CA | Certificate Authority |
| OCSP | Online Certificate Status Protocol |
| CMLA | Content Management License Administrator |

Figure 1A:
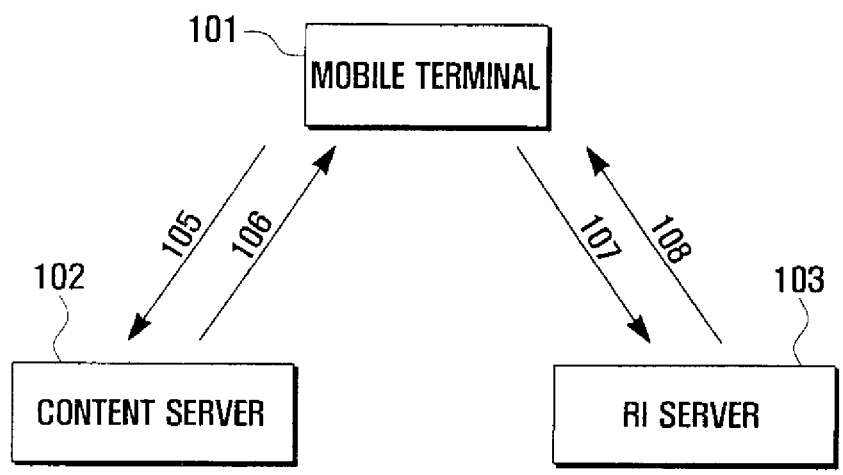
FIGS. 1a and 1b are diagrams illustrating RO delivery procedures in conventional OMA DRM systems.
Figure 1B:
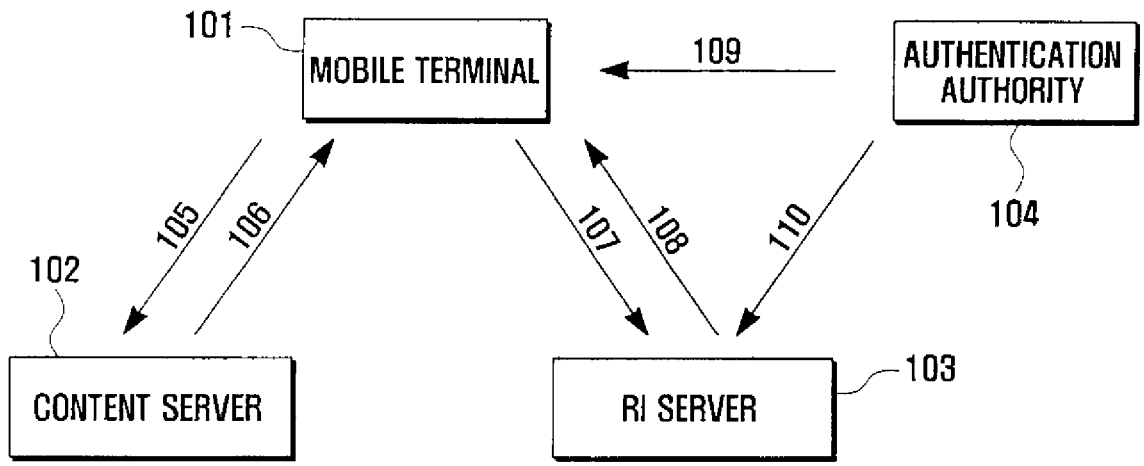
Figure 2:
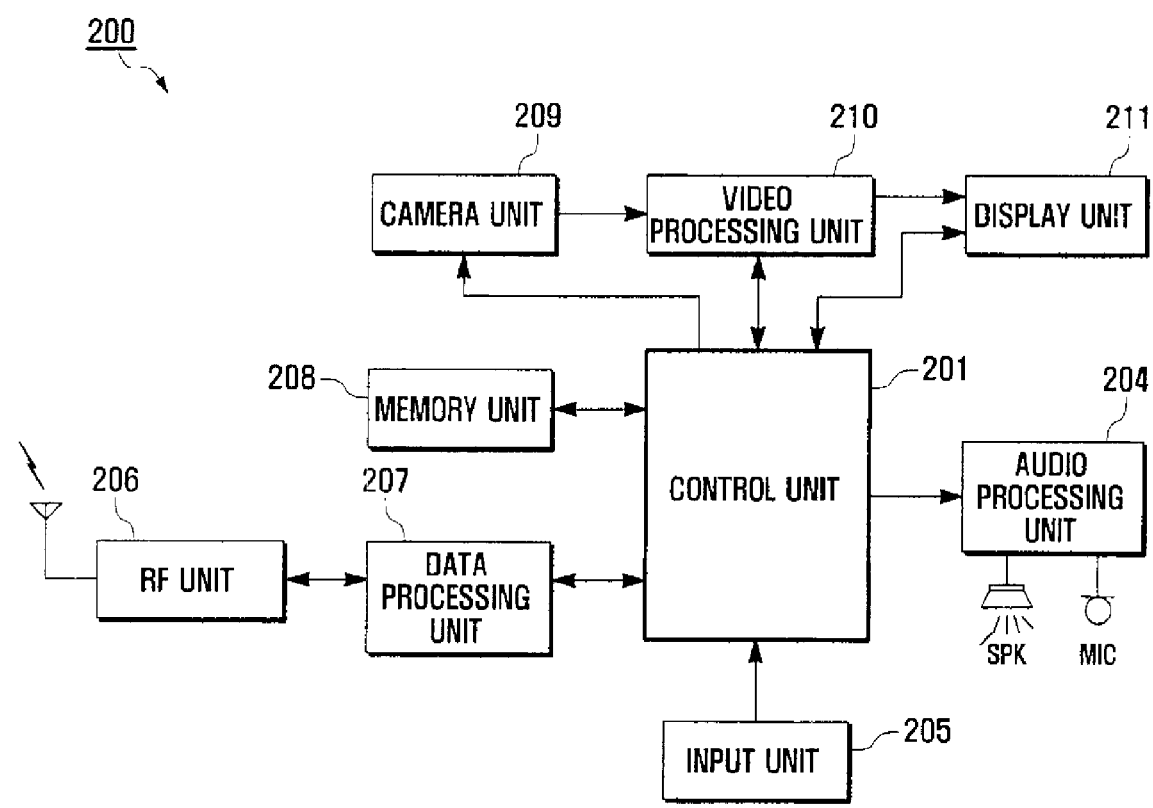
FIG. 2 is a block diagram illustrating an exemplary configuration of a mobile terminal according to an exemplary embodiment of the present invention.

FIG. 2 is a block diagram illustrating a configuration of a mobile terminal according to an exemplary embodiment of the present invention.

Referring to FIG. 2, the mobile terminal 200 includes a control unit 201, an audio processing unit 204, an input unit 205, a radio frequency (RF) unit 206, a data processing unit 207, a memory unit 208, a camera unit 209, a video processing unit 210, and a display unit 211.

The control unit 201 controls general operations of the mobile terminal 200 and cooperative signaling between the internal elements of the mobile terminal 200. In other words, the control unit 201 controls the cooperative signaling among the audio processing unit 204, input unit 205, data processing unit 207, memory unit 208, camera unit 209, video processing unit 210, and display unit 211.

If a play command is detected, the control unit 201 checks information on the target DRM content file (e.g., DCF file) and performs a series of processes for decoding and playing the DRM content file.

For example, the control unit 201 checks ROs stored in the memory unit 208 when an access to the content is detected or a value of a specific constraint contained in the RO becomes unavailable. In a case of an available RO is retrieved, the DRM content can be played.

Still referring to FIG. 2, the audio processing unit 204 converts audio data into an analog signal and outputs the analog signal through a speaker (SPK) in the form of an audible sound wave and converts the analog signal input through a microphone (MIC) into audio data.

The input unit 205 can be implemented, for example, with at least one of a keypad and a touch panel including a plurality of alphanumeric keys for inputting text and numeric data and a plurality of function keys for executing various functions of the mobile terminal 200. The input unit 205 receives a key input and outputs an input signal corresponding to the key input to the control unit 201. The control unit 201 executes a task indicated by the input signal.

The RF unit 206 is responsible for radio communication with a cellular network or any other type of wireless communication network. The RF unit 206 includes an RF transmitter for up-converting and amplifying the signal to be transmitted and an RF receiver for low-noise amplifying and down-converting the received signal.

The data processing unit 207 includes a transmission portion for encoding and modulating a signal to be transmitted through the RF unit 205 and a reception portion for demodulating and decoding the signal received through the RF unit 205.

The memory unit 208 includes a program memory region and a data memory region. The program memory region stores the operating system for booting up the mobile terminal 200 and application programs. The data memory region stores user data with the execution of the applications. The user data can be copied from an external storage such as portable memory and hard disc or downloaded from a remote server or other mobile terminal through a wired or wireless communication channel. Particularly, the user data include DRM contents.

The camera unit 209 converts an image projected on a lens into an optical signal and converts the optical signal into a digital signal. The video processing unit 210 converts the digital signal output by the camera unit 209 into a video signal for generating screen data.

The display unit 211 displays the screen data output by the video processing unit 210. The display unit 211 is implemented with a flat panel display, such as a liquid crystal display (LCD) having a touchscreen function. In this case, the display unit 211 can be a part of the input unit 206. When a content is used to the usage limit of a constraint contained in the corresponding RO, the display unit 211 may display a RO package acquisition solicitation message under the control of the control unit 201.

Although the mobile terminal is described above with the structure depicted in the exemplary drawings, it will be understood that at least one of the internal units of the mobile terminal may be omitted, or replaced by another functional unit. In addition at least another functional unit not shown in the drawings, may be added to the mobile terminal. In other words the functional units could be fewer or greater than those shown in the examples, and may have different functionality.

For example, the mobile terminal 200 may provided with a memory slot for receiving external storage media such as memory card, a short range communication module such as Infrared Data Association (IrDA) and Bluetooth, multimedia module such as MP3 module, electronic transaction module such as mobile banking chip and traffic card chip, broadcast receiver module, data communication port for exchanging data with other devices, battery module, and power charging module.

Figure 3A:
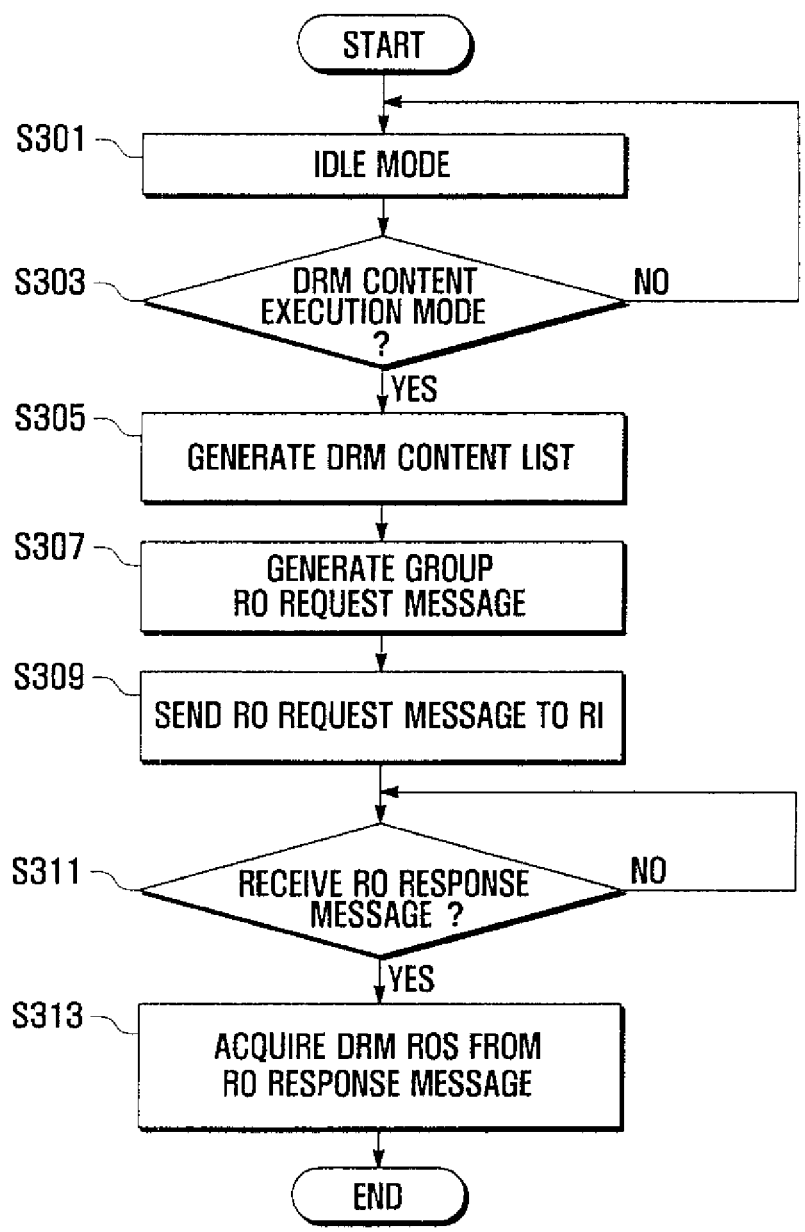
FIG. 3a is a flowchart illustrating an overview of a rights object acquisition method according to an exemplary embodiment of the present invention.

FIG. 3a is a flowchart illustrating an example of a rights object acquisition method according to an exemplary embodiment of the present invention.

In FIG. 3a, a mobile terminal, such as, for example, the mobile terminal 200 shown in FIG. 2, operates in an idle mode (S301). While operating in the idle mode, the mobile terminal 200 determines whether a DRM content execution mode has been activated (S303). The DRM content execution mode is activated when an access event (consumption, update, or purchase) to a specific DRM content object is detected.

If a DRM content execution mode is activated at step (S303), the mobile terminal generates a DRM content object list in response to a DRM RO acquisition command input by the terminal user 150 (S305).

The DRM content objects are encrypted multimedia files to which corresponding ROs are not acquired or nearly expired in association with their constraints.

In order to generate the DRM content object list (S305), the terminal generates a RO Acquisition Protocol (ROAP) trigger request (common rights object acquisition request) message for requesting information on the DRM content objects selected or approved by the terminal user 150.

The ROAP trigger request message includes a content identifier (CID, contentID) of at least one DRM content object. The ROAP trigger request message may further include at least one of a device identifier (DeID) of the mobile terminal 200, permissions of individual ROs, and constraints for restricting the permissions.

Permissions are actual usages or activities allowed over protected content. For example, in the case of content granted only, the "display" permission can be only displayed, and the content granted the "display" and "print" permissions can be displayed and printed.

The mobile terminal 200 generates an ROAP trigger request message containing the DRM content list and sends the ROAP trigger request message to the RI. In this exemplary embodiment, the mobile terminal 200 is connected through at least one wired or wireless communication networks.

The RI generates a ROAP trigger (a common rights object acquisition response) message with reference to the CIDs of the contents listed in the ROAP trigger request message and transmits the ROAP trigger message to the mobile terminal 200. At this time, costs for purchasing the contents are contained in the ROAP trigger message. The ROAP trigger message contains at least one of the RO identifier (roID) assigned to the content. The ROAP trigger message may contain at least one rights object acquisition address of the content (roapURL) element, RI identifier (RIID), RI Alias, Domain ID, Domain Alias, and Nonce. The Nonce element is a random value of 32 or 64 bits assigned by the RI.

The control unit 201 receives the ROAP trigger message and generates the DRM content list composed of contents. At this time, the control unit 201 displays purchasing cost information on the screen of the display unit 211 for obtaining user consent.

In this exemplary embodiment, the RI generates and sends a ROAP trigger message referencing RO identifiers assigned to ROs corresponding individual contents. The mobile terminal 200 requests to RI an ROAP trigger message for multiple contents through the ROAP trigger request message.

Still referring to FIG. 3a, after generating the DRM contents list at step S305, the control unit 201 generates an RO Request message for acquiring ROs corresponding to the contents listed in the DRM contents list (S307).

The RO Request message contains roIDs assigned to the ROs corresponding to the contents. The roIDs can be extracted from the ROAP trigger message received from the RI in response to the ROAP trigger request message. The RO Request message also contains parameters such as DeID, RIID, Nonce, request time, RO Information (RO Info), certificate chain, signature, and extensions.

Table 2 shows an exemplary RO Request message format according to an exemplary embodiment of the present invention. In Table 2, the RO Request message contains roIDs (ro11, ro53, and ro97) of three contents selected by the user and a nonce identical with that contained in the ROAP trigger message. The roIDs also are contained the ROAP trigger message received from the RI.

TABLE 2

<roap:roRequest xmlns:
roap"urn:oma:bac:dldrm:roap-1.0"triggernonce=uPjd/olB1SkflpSrkhf/
<roID>ro11; ro53; ro97</roID>

The mobile terminal 200 sends the RO Request message to the RI through a wired or wireless communication network (S309).

Moreover, the RI may verify the RO Request message. In this case, if the RO Request message is successfully verified, the RI generates a RO Response message and sends the RO Response to the mobile terminal 200.

The RO Response message states a plurality of protectedROs. With the <roap:protectedRO> element, a plurality of values can be contained in a single RO Response message without increasing computation amount since the values of the rights objects decrease by using a hash algorithm.

After sending the RO Request message, the control unit 201 determines whether a RO Response message has been received in response to the RO Request message (S311). The RO Response message contains ROs corresponding to the DRM content objects.

Table 3 shows an exemplary RO Response message according to an exemplary embodiment of the present invention. In Table 3, the RO Response message contains the roIDs (ro11, ro53, and ro97) indicating the ROs issued by the RI.

TABLE 3

<roap:roResponse xmlns: roap"urn:oma:bac:dldrm:roap-1.0"status= "Success"
<nonce>uPjd/olB1SkflpSrkhf/
<roID>ro11; ro53; ro97</roID>

The RO Response message also contains parameters such as Status, DeID, RIID, ProtectedRO, Certificate Chain, Online Certificate Status Protocol (OCSP), OCSP Response, Signature, and Extensions.

A Nonce can be optionally contained in the RO Response message. In this case, the Nonce is identical with that of the ROAP trigger message and RO Request message. In other words, the RO Response message is the ROAP trigger message and RO Request message contain the same Nonce.

Figure 3B:
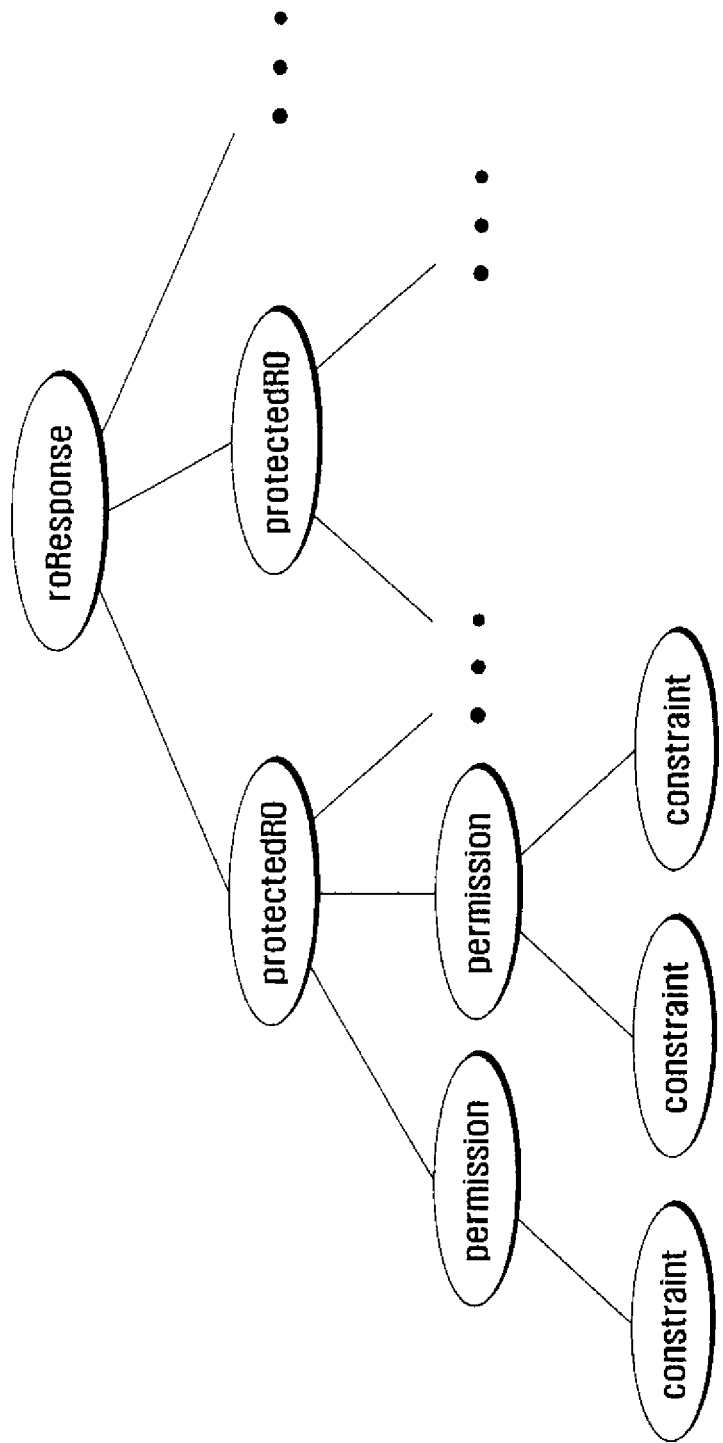
FIG. 3b is diagram illustrating an exemplary data structure of an ROAP trigger (RO response) message according to an exemplary embodiment of the present invention.

FIG. 3b is diagram illustrating a data structure of an RO response message according to an exemplary embodiment of the present invention.

The RO response message is sent from the RI to the mobile terminal in response to an RO Request message. As shown in FIG. 3b, the RO Response message includes the protected ROs (protectedRO) for individual contents, and each protectedRO contains at least one permission with at least one constraint. In a case of RO Response message for a multipart DCF containing an MP3 file and an image file, two protectedRO are carried by the RO Response message. The protectedRO may contain a "play" permission with a constraint element set to "one month" or "one week and 7 times". For example, the value of "one week and 7 times" of the constraint element means that the MP3 file is restricted to be played 7 times during a week. The protectedRO may contain a "display" permission with "one month", "ten times" or "one month and ten times". That is, the constraints are dependent on the permissions.

Moreover, the permissions include "play", "display", "execute", and "print". The constraints include "count", "timed-count", "datetime", "interval", "individual", and "system".

If an RO Response message is received from the RI 250, the control unit 201 of the mobile terminal 200 acquires the ROs corresponding to the contents from the RO Response message (S313).

The control unit 201 updates the contents with the acquired ROs. The update means to extend the usage rights on the expired contents or enable consumption of the newly downloaded contents.

Figure 4:
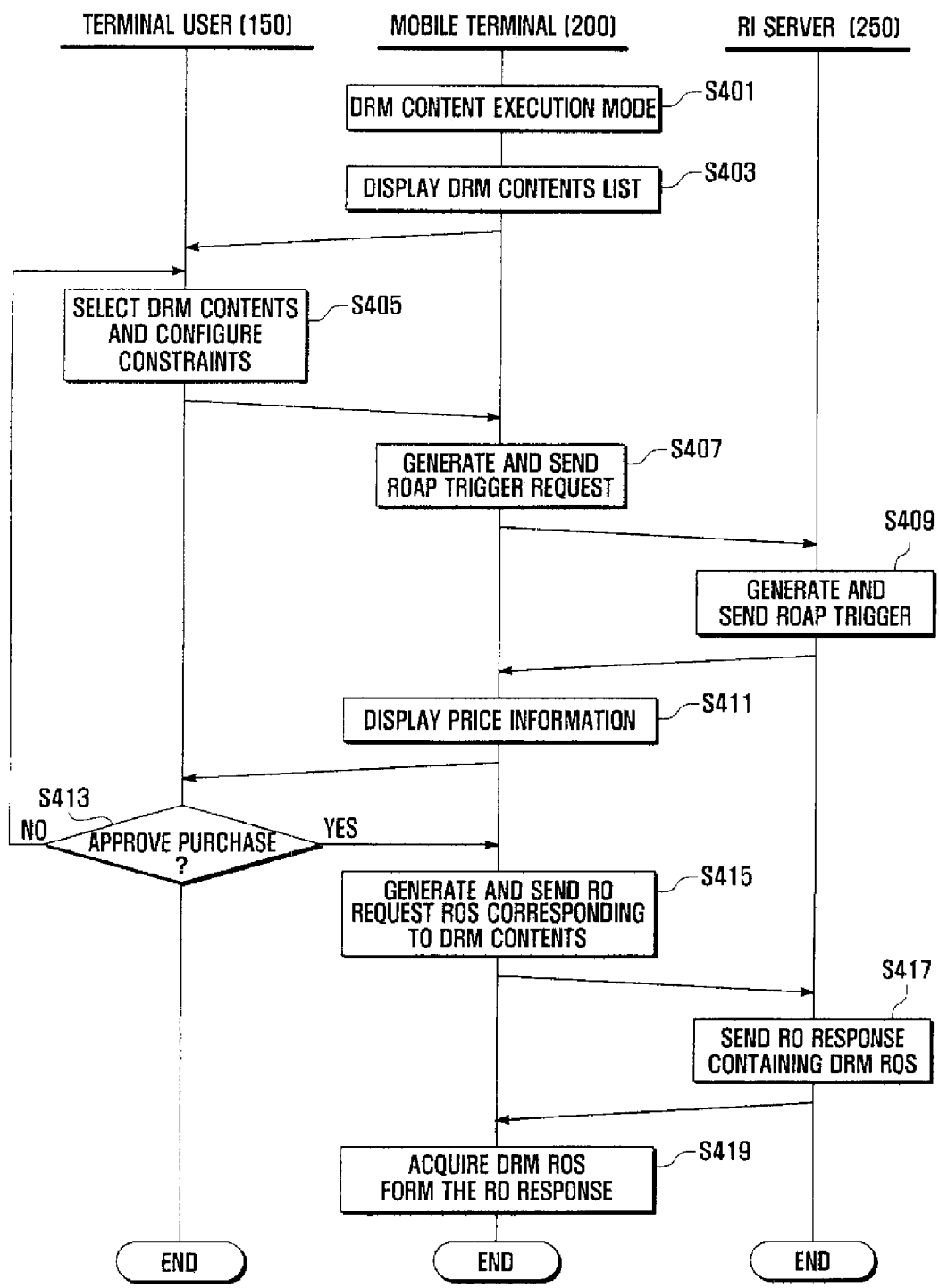
FIG. 4 is a message flow diagram illustrating an example of a rights object acquisition method according to an exemplary embodiment of the present invention.

FIG. 4 is a message flow diagram illustrating a rights object acquisition method according to an exemplary embodiment of the present invention.

Referring to FIG. 4, the rights object acquisition method of FIG. 3a is described primarily with message flows between the mobile terminal 200 and RI 250 connected through wired/wireless communication network and interactions between a terminal user 150 and the mobile terminal 200.

Figures 11A, 11B:
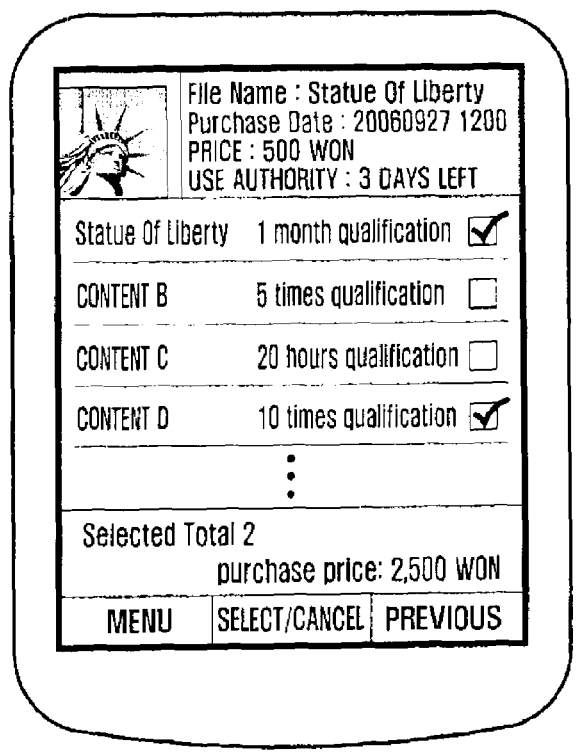

The control unit 201 of the mobile terminal 200 enters into a DRM content execution mode in response to a predetermined event (S401). If the mobile terminal 200 enters into the DRM content execution mode, the control unit 201 controls the display unit 211 displays a DRM content list or a RO package acquisition solicitation message on a screen (S403). FIG. 11a is a screen image illustrating a step of displaying the DRM content list in FIG. 4, and FIG. 11b is a diagram illustrating an exemplary information field structure of a DRM content list of FIG. 11a.

As shown in the example in FIG. 11a, the DRM content list is generated with the DRM content objects of which usage rights have expired or are close to expiration. The control unit 201 retrieves the DRM content objects from DRM content database stored in the memory unit 208.

Now referring to FIG. 4 again, while displaying the DRM content list, the terminal user 150 selects at least one DRM content object for which an RO is acquired and sets constraints associated with usage duration and times of the content (S405).

If the content selection and constraint settings are completed, the control unit 201 generates an ROAP trigger request with the settings of the selected contents and sends RO Request to the RI 250 (S407).

In response to the generating and sending of the ROAP trigger request, if a ROAP trigger request is received, the RI 250 generates an ROAP trigger with reference to the settings contained in the ROAP trigger request and sends the ROAP trigger to the mobile terminal 200 (S409). The ROAP trigger may contain, for example, information on the prices of the ROs. In this case, the mobile terminal 200 calculates a purchasing cost on the basis of the prices and displays the information the purchasing cost on the screen (S411). Also, the mobile terminal 200 outputs a message asking whether to confirm or cancel the purchase on the RO.

Still referring to FIG. 4, the terminal user 150 decides whether to confirm or cancel the purchase on the RO (S413). If the terminal user 150 cancels the purchase, the mobile terminal 200 repeats step S403 such that the user selects the DRM content objects and sets the constraint again at step S405.

If the terminal user 150 confirms the purchase on the RO, the mobile terminal 200 generates a RO Request (roRequest) message for acquiring the purchase-confirmed RO and sends the roRequest message to the RI 250 (S415).

If a purchase-confirm command is input through the input unit 205, the mobile terminal 200 processes a payment for purchasing the RO with the RI 250 through an authentication or mobile banking procedure. For this reason, the mobile terminal 200 is provided with, for example, an electronic transaction module or a mobile banking module.

If the roRequest message is received, the RI 250 generates an RO response (roResponse) message containing the requested DRM RO and sends the roResponse message to the mobile terminal 200 (S417).

If the roResponse message is received, the mobile terminal 200 acquires the purchased DRM RO from the roResponse message (S419).

In a case of an RO acquisition for free content or post-payment content, the price exchange, purchase confirmation, and payment steps can be skipped.

Figure 5:
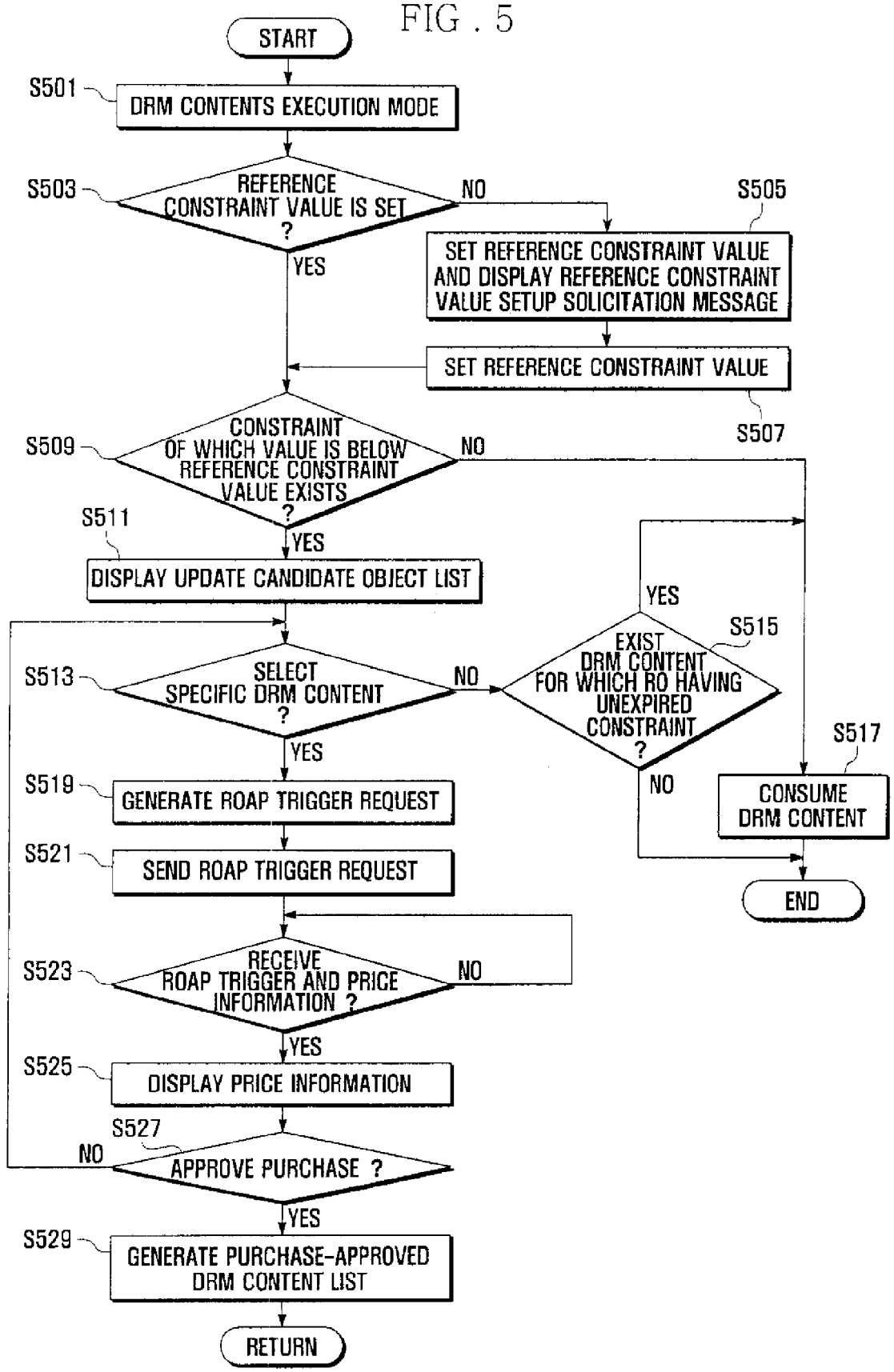
Figure 6:
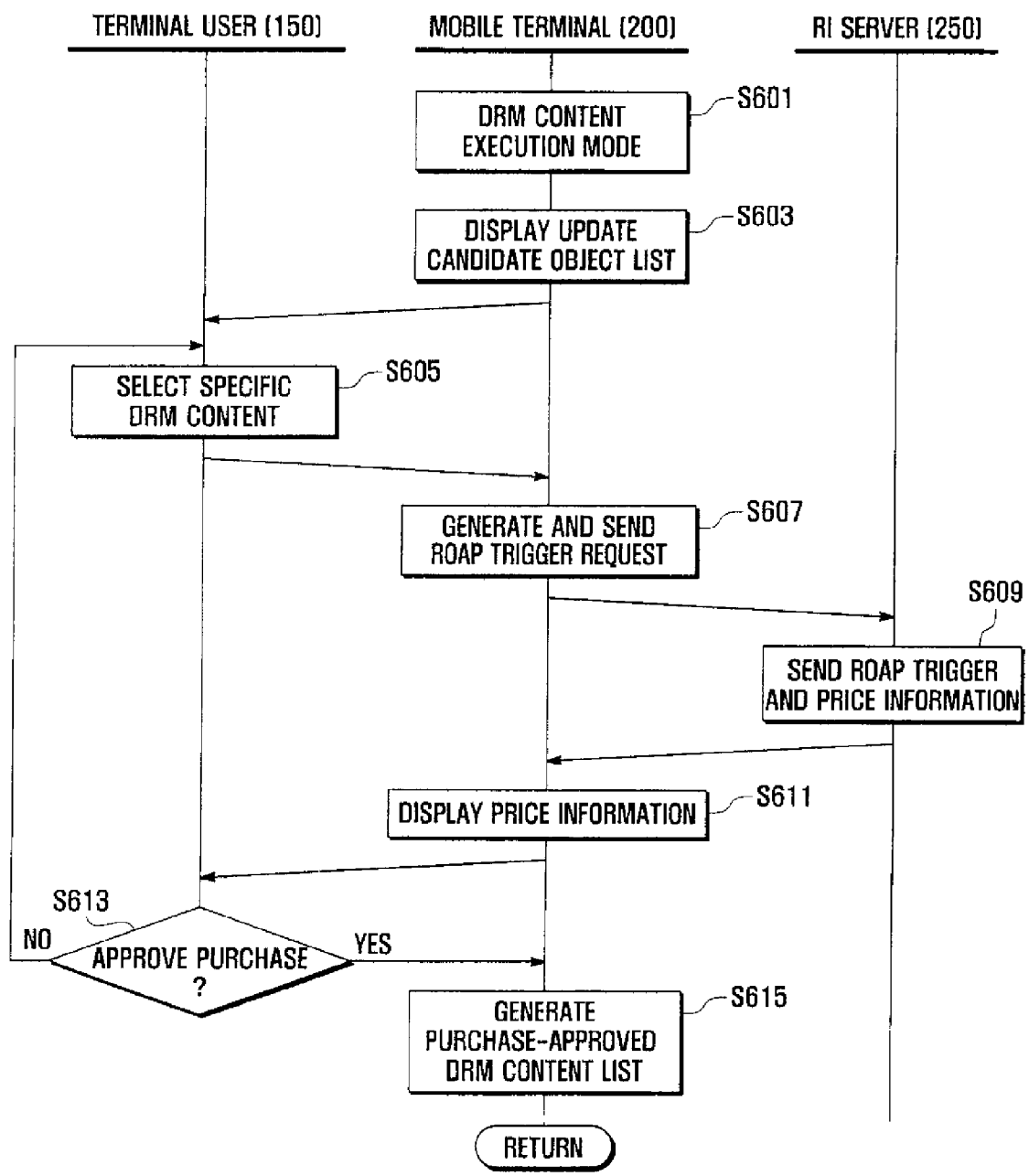
FIG. 6 is a message flow diagram illustrating exemplary message flows between entities in the DRM content list generation procedure of FIG. 5.

FIG. 5 is a flowchart illustrating an example of a DRM content object list generation procedure of the rights object acquisition method of FIG. 3a, and FIG. 6 is a message flow diagram illustrating exemplary message flows between entities in the DRM content list generation procedure of FIG. 5. In FIGS. 5 and 6, it is assumed that the DRM content list is composed of items representing DRM content objects stored within the memory unit 208 of the mobile terminal 200, at step S305 of FIG. 3a.

Figure 8:
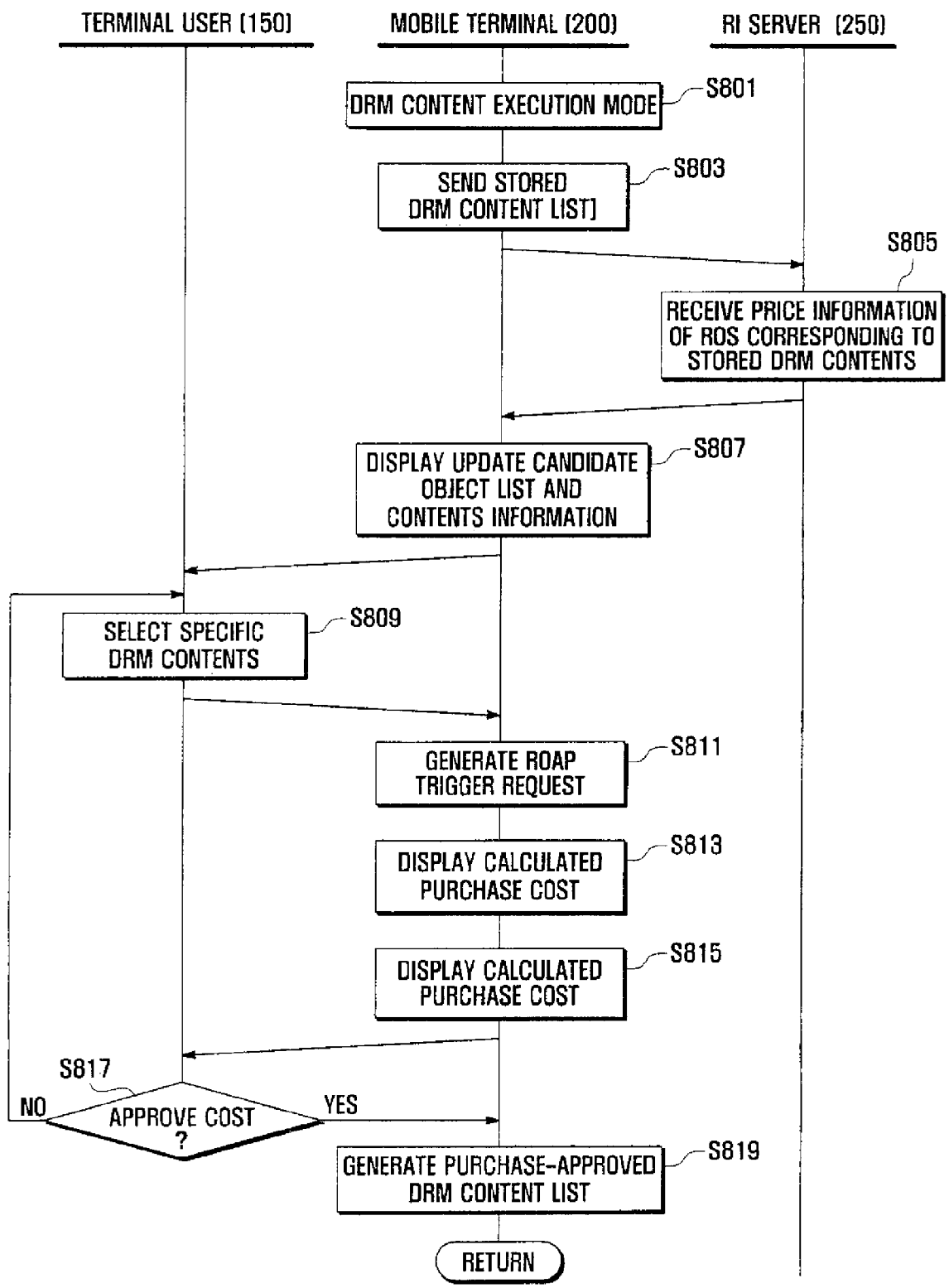
FIG. 8 is a message flow diagram illustrating exemplary message flows between entities in the DRM content list generation procedure of FIG. 7.
Figure 10:
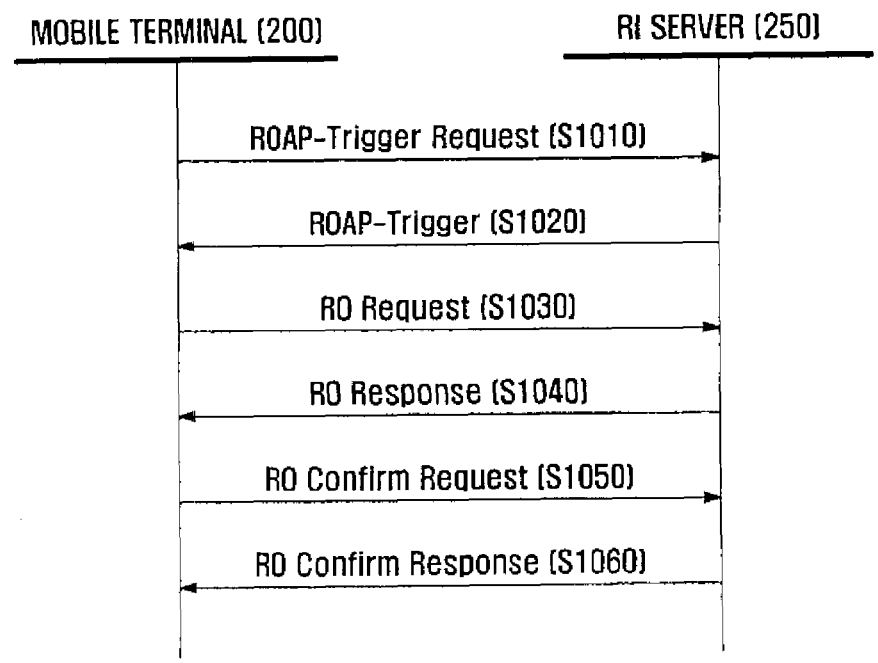
FIG. 10 is a message flow diagram illustrating a right object acquisition method according to another exemplary embodiment of the present invention.

A DRM RO acquisition system for implementing the RO acquisition method according to the present invention includes a mobile terminal 200 for requesting the ROs for composite contents and an RI 250 for issuing the ROs to the mobile terminal 200 (see FIGS. 6, 8 and 10). The RI 250 sends additional information on a number of available constraint updates and price information of the respective ROs to the mobile terminal 200.

The mobile terminal 200 operates in the DRM content execution mode (S501 and S601). In the DRM content execution mode, the mobile terminal 200 then determines whether at least one reference constraint value of a DRM content object has been set (S503). The reference constraint values are set, for example, to judge maturity of the expiration of the usage times and duration of the DRM content object. For example, the reference constraint value can have the remaining available usage times set to 1, or have the remaining available usage duration set to 1 hour. In a case that the reference constraint values have not been set, the mobile terminal 200 may output a reference constraint value setup solicitation message (S505). Accordingly, the mobile terminal 200 sets a reference constraint value according to a user manipulation of a series of setup menu screens (S507).

Next, the mobile terminal determines whether there is at least one DRM content object of which usage right has expired, or is close to expiration/exhaustion, with reference to the reference constraint value (S509). In other words, the mobile terminal 200 retrieves the DRM content objects of which usage right has expired, or is about to expire (e.g. nearly expired), from the memory unit 208 of the mobile terminal 200. If no DRM content object of which the usage right has expired or is closed to expiration, the mobile terminal executes a command input by the terminal user 150 in association with a DRM content object (S517).

If at least one DRM content object of which RO has a constraint value equal to or less than the reference constraint value (update candidate object) exists, the mobile terminal 200 generates and displays an update candidate object list composed of the update candidate objects together with file information of the individual update candidate DRM content objects (S511 and S603). The file information includes remained usage times and durations of the individual DRM content objects.

Next, the mobile terminal 200 detects a user command and determines whether a user command is an object selection command for selecting a specific DRM content object from the update candidate object list (S513 and S605).

The ROs associated with DRM content objects selected on the update candidate DRM content list are acquired (purchased). The DRM content object selected by the user is presented with a marker marked in a check box provided at a side of the DRM content object as shown in FIG. 11*a*.

The DRM content list structured in the form of a table as shown in the example in FIG. 11*b*. The DRM content table is composed of, for example, a serial number field, a content name field, a remaining usage right field, and another field. An example of usage of the other field is for a file extension indicating the type of the content. The DRM content list may provide information obtained from the RI 250. For example, an information field can be provided for indicating information received from the RI 250 such as updated times of available constraints associated with the DRM contents and prices of the right objects. The DRM content list can be displayed with the RO package acquisition solicitation message for obtaining user consent.

If the user command is not an object selection command, the mobile terminal 200 determines whether the user command is an object consumption command for consuming at least one update candidate object of which associated constraint has not expired (S515). If the user command is an object consumption command for consuming a specific update candidate object of which associated constraint has not expired, the mobile terminal 200 consumes the specific update candidate object (S517).

However, if the user command is not an object consumption command or there is no update candidate object of which associated constraint has not expired, the mobile terminal ends the DRM object consumption mode.

In the meantime, if the user command is an object selection command (at step S513), the mobile terminal 200 generates an ROAP trigger request with an object package containing at least one update candidate object selected by the user command (S519 and S607).

The ROAP trigger request includes but is not limited to CIDs of selected DRM contents. As described above, the ROAP trigger request may include at least one of the DeID of the mobile terminal 200, permissions or ROs to the contents, and constraints restricting permissions.

The constraints (i.e., the restriction information of the ROs corresponding to the DRM contents) can be selected by DRM content or set with same usage times or duration. If the user sets the constraints for the DRM contents through a webpage of the RI 250, the mobile terminal 200 accesses the RI 250 through the wired/wireless network, so as to set the constraints for the DRM contents stored in the mobile terminal 200.

After generating the ROAP trigger request in the above manner, the mobile terminal 200 sends the ROAP trigger request to the RI 250 through the wired/wireless communication network (S521).

If the ROAP trigger request is received, the RI 250 generates a ROAP trigger and sends the ROAP trigger to the mobile terminal 200 in response to the ROAP trigger request (S609). The ROAP trigger is sent together with the price information on the corresponding DRM contents.

The ROAP trigger contains roIDs assigned the ROs corresponding to the DRM contents. Also, the ROAP trigger may contain ROAP address (roapURL) or the RI 250. The ROAP trigger may further selectively contain one or more of the RI ID, RI Alias, Domain ID, and Domain Alias.

When security is required, the RI 250 sends the ROAP trigger having a Nonce value to the mobile terminal 200.

After transmitting the ROAP trigger request, the mobile terminal 200 determines whether a ROAP trigger and price information is received (S523).

If a ROAP trigger and price information is received, the mobile terminal 200 displays the price information on the screen of the display unit 211 (S525 and S611). For example, a guide message "total price is 2500 won. Do you want to purchase the ARM contents package?" is displayed for notifying the user of the total price of the DRM ROs.

Next, the mobile terminal 200 detects a user command and determines whether the user command is a purchase approval command (S527). If the user command is not a purchase approval command, the control unit 201 determines that the user command is a purchase cancellation command and repeats step S513 such that the terminal user 150 reselects DRM contents. If the user command is a purchase approval command, the control unit 201 generates a purchase-approved DRM content list of which ROs are to be purchased in an in package (S529 and S615). It should be understood that a purchase should be defined broadly and could, for example, include a prepaid account where a purchase is a deduction from a prepaid balance After generating the DRM contents list, the mobile terminal 200 generates an RORequest message with the DRM contents list at step S307 of FIG. 3*a*.

Figure 7:
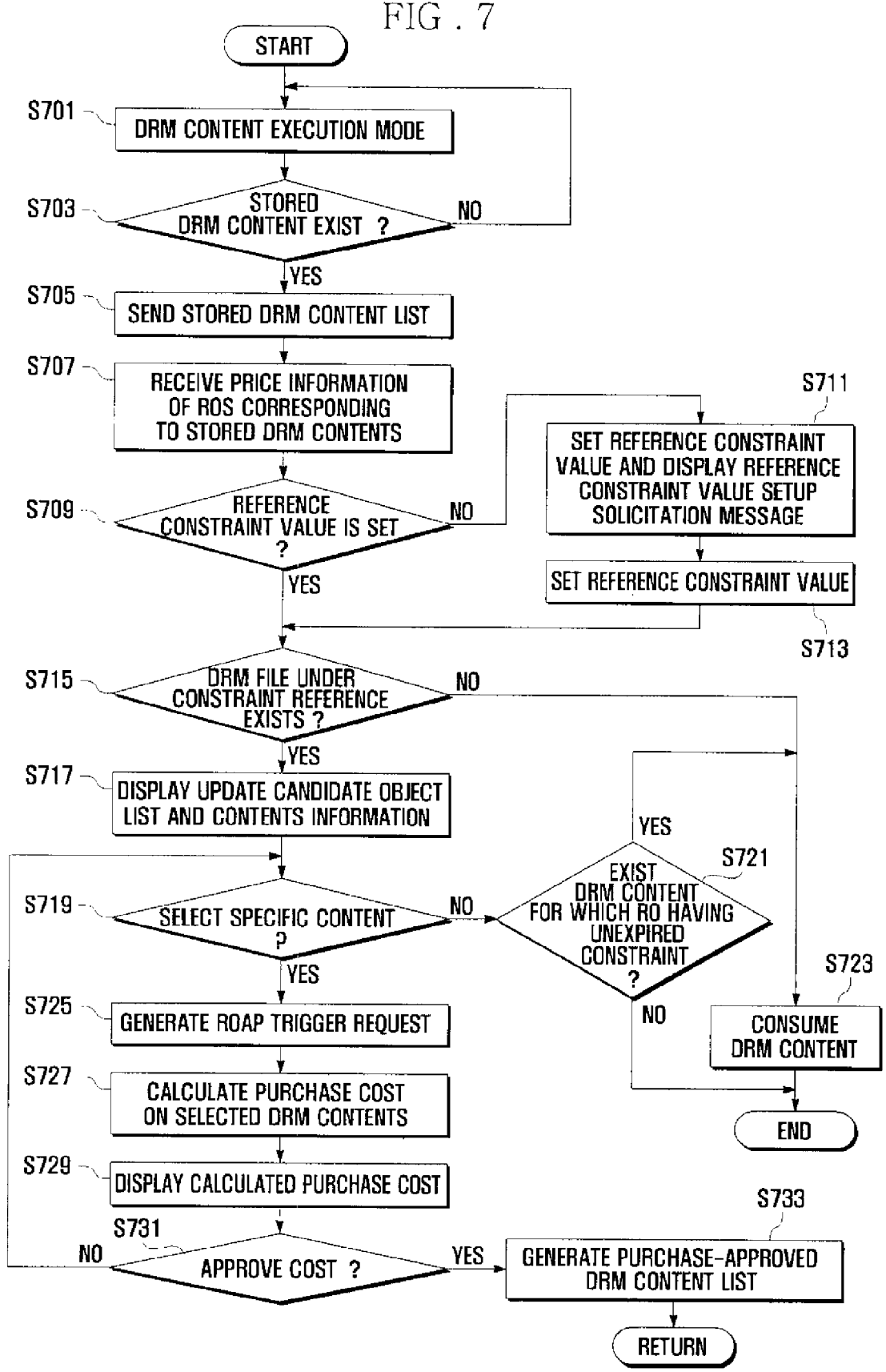
FIG. 7 is a flowchart illustrating examples of a DRM content list generation procedure of the rights object acquisition method of FIG. 3a according to another exemplary embodiment of the present invention.

FIG. 7 is a flowchart illustrating an example of a DRM content list generation procedure of the rights object acquisition method of FIG. 3*a* according to another exemplary embodiment of the present invention, and FIG. 8 is a message flow diagram illustrating exemplary message flows between entities in the DRM content list generation procedure of FIG. 7.

In FIGS. 7 and 8, it is assumed that the mobile terminal 200 has received the price information of the DRM contents from the RI 250.

The mobile terminal 200 operates in the DRM content execution mode (S701 and S801). In the DRM content execution mode, the control unit 201 of the mobile terminal 200 determines whether at least one DRM content object exists in the memory unit 208 (S703). If no DRM content object exists in the memory unit 208, the mobile terminal 200 maintains a standby state. If at least one DRM content object exists, the mobile terminal 200 connects to the RI 250 through a wired/wireless communication network and sends a stored DRM content list listing the DRM content objects stored within the memory unit 208 (S705 and S803). Next, the mobile terminal 200 receives price information on the ROs associated with the DRM content objects listed in the DRM content list from the RI 250 (S707 and S805).

Still referring to FIGS. 7 and 8, after receiving the price information, the mobile terminal 200 determines whether a reference constraint value of ROs corresponding to the DRM content objects (S709) is set.

If no reference constraint values of ROs are set, the mobile terminal 200 displays a reference constraint value configuration solicitation message (S711) and configures a reference constraint value in accordance with user input (S713). If the reference constraint value is configured, the mobile terminal 200 determines whether at least one DRM content object of which RO has a constraint value equal to or less than the reference constraint value exist in the memory unit 208 (S715).

If no DRM content object of which RO has a constraint value equal to or less than the reference constraint value exists, then the mobile terminal 200 consumes a DRM content object selected by the user (S723).

On the other hand, if at least one DRM content object of which RO has a constraint value equal to or less than the reference constraint value (update candidate object) exists, the mobile terminal 200 generates and displays an update candidate object list composed of the update candidate objects together with contents information of the individual update candidate objects (S717 and S807). The file information also includes residual usage times and duration of the individual DRM content objects.

Next, the mobile terminal 200 detects a user command and determines whether a user command is an object selection command for selecting a specific DRM content object from the update candidate object list (S719 and S809). If the user command is not an object selection command, the mobile terminal 200 determines whether the user command is an object consumption command for consuming at least one update candidate object of which an associated constraint has not expired (S721). If the user command is an object consumption command for consuming a specific update candidate object of which associated constraint has not expired, the mobile terminal 200 consumes the specific update candidate object (S723).

If the user command is not an object consumption command or there is no update candidate object of which associated constraint has not expired, the mobile terminal ends the DRM object consumption mode.

In the meantime, if the user command is an object selection command at step S719, the mobile terminal 200 generates a temporary DRM contents list composed at least one update candidate object selected by the user command (S725 and S811).

Next, the mobile terminal 200 calculates a cost for purchasing the objects listed in the temporary DRM contents list on the basis of price information received, at step S707, from the RI 250 (S727 and S813) and displays the purchase cost (S729 and S815).

While displaying the purchase cost, the mobile terminal 200 detects a user command input by the terminal user 150 and determines whether the user command is a purchase approval command (S731 and S817). If the user command is not a purchase approval command, the mobile terminal 200 regards the user command is a purchase cancellation command, so as to repeat steps S715 to S731.

If the user command is a purchase approval command, the mobile terminal 200 generates a DRM contents list of which ROs to be purchased in a package (S733 and S819).

After generating the DRM contents list, the mobile terminal 200 then generates an RO Request message with the DRM contents list at step S307 of FIG. 3a.

Figure 9:
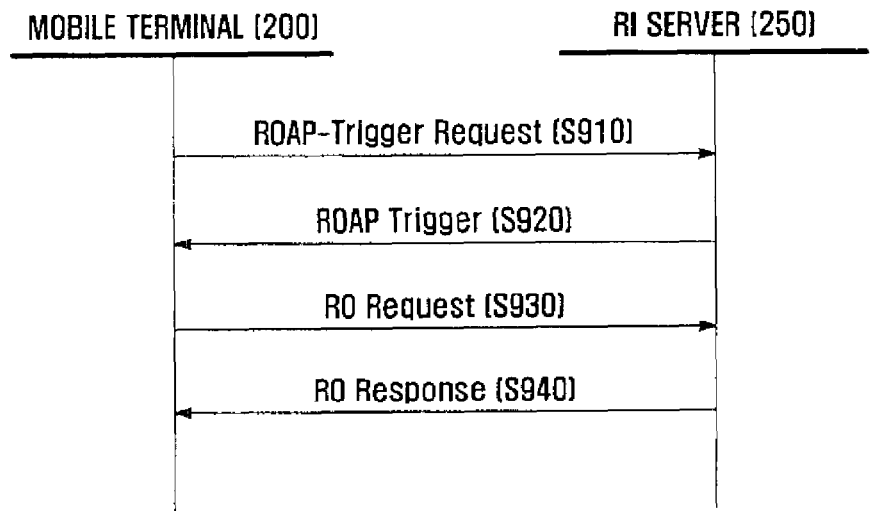
FIG. 9 is a message flow diagram illustrating an exemplary rights object acquisition method according to another exemplary embodiment of the present invention.

FIG. 9 is a message flow diagram illustrating an example of a rights object acquisition method according to another exemplary embodiment of the present invention.

Referring to FIG. 9, if an RO acquisition command is input for acquiring ROs corresponding to one or more DRM content objects, the mobile terminal 200 generates an ROAP Trigger Request message and sends the ROAP Trigger Request message to the RI 250 (S910). The ROAP Trigger Request message includes at least one content identifier (CID). The ROAP Trigger Request message also includes at least one of the device identifier (DeID) of the mobile terminal 200 and constraints for restricting the usage rights of the selected content objects.

In a case that a parent license of at least two child licenses exists, the ROAP Trigger Request message may further includes the parent license information. For example, in order to acquire two ROs for a track 1 and a track 3 dependent on a music album A, the ROAP Trigger Request message may include an identifier of album A in addition to the identifiers of the track 1 and track 2. In this case, the ROs for the track 1 and track 3 can be acquired only with the RO for the album A afterward.

By constraining the play permissions of the track 1 and track 3 with a parent RO, either track 1 and track 3 can be played up to a total usage times restricted by a constraint of the parent RO.

Also, different parent licenses can be applied. For example, the user may create a content list (e.g., my list and favorite list) as a parent group. In this case, the rights objects of the content objects listed in the content list depends on the multiple rights object for the content list.

The DRM content object may comprise a content object that is received from another device (for example, another terminal or server) but has not acquired a corresponding RO, or of which the RO has expired.

The mobile terminal 200 selects an RI for purchasing an RO of at least one DRM content object with reference to an RI's Uniform Resource Location (URL) information contained in the header information of the DRM content object. The ROAP Trigger Request message is sent to the RI URL.

In order to send the ROAP Trigger Request message, a DCF structure has an additional field indicating the address of the RI 250 for acquiring multiple ROs in a composite manner.

Figure 13:
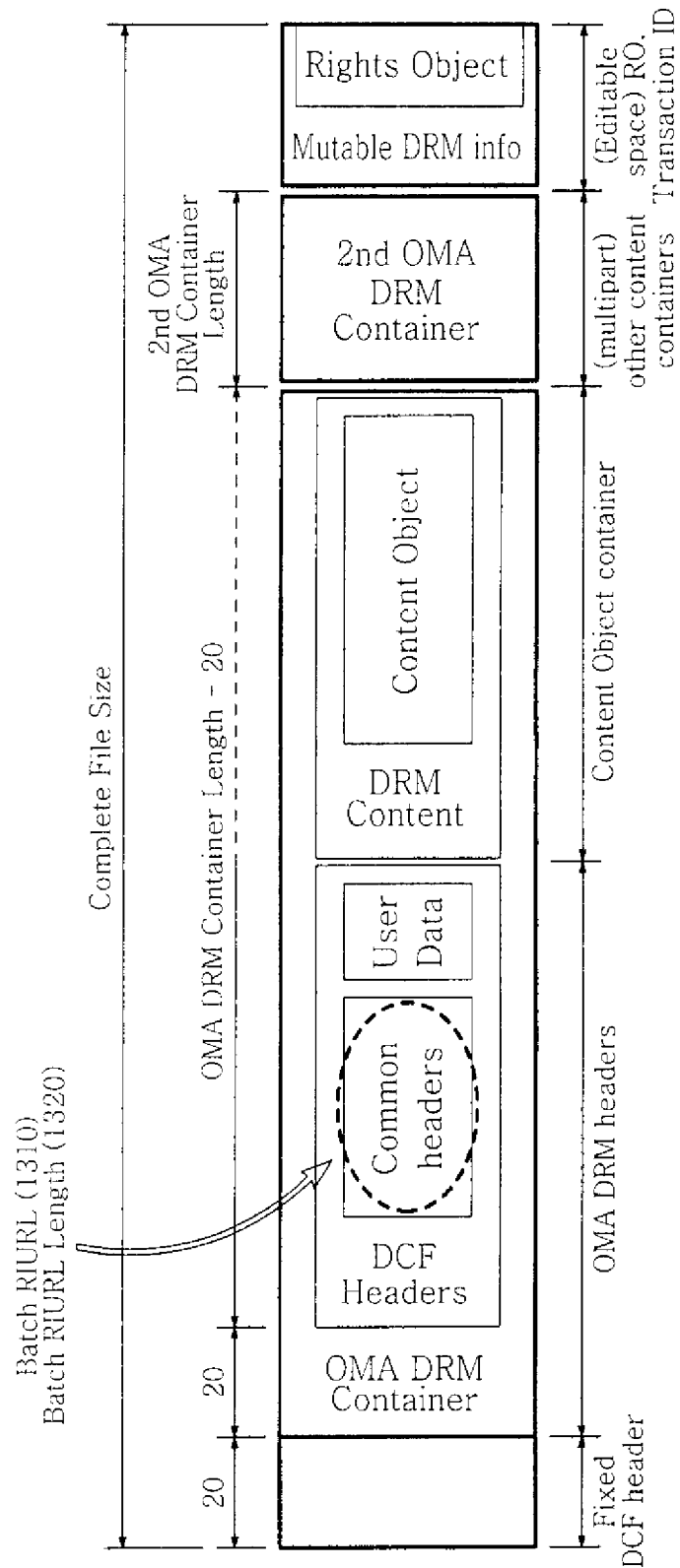
FIG. 13 is a diagram illustrating a structure of DCF proposed for the rights object acquisition method according to an exemplary embodiment of the present invention.

FIG. 13 is a diagram illustrating a structure of DCF proposed for the rights object acquisition method according to an exemplary embodiment of the present invention.

In FIG. 13, a BatchRIURL 1310 is an address of RI which is issuing a multiple RO, and a BatchRIURLLength 1320 indicates a length of the BatchRIURL 1310.

The BatchRIURLLength 1320 is optional information, so as not to be included in the DCF structure.

At least one BatchRIURL is included in a DCF structure. The greater a number of BatchRIURL is, the more the ROs content objects can be sent.

For example, if a content A includes a BatchRIURL A and a content B includes a BatchRIURL B, it can be difficult to acquire the ROs of the contents A and B in a composite manner. However, if the BatchRIURLs A and B are included in the content A, the ROs of the contents A and B can be acquired in a composite manner since the common RI address B from which the ROs of the two contents A and B can be acquired exist.

In a case that at least two BatchRIURLs exist from which ROs of the content objects can be acquired, a BatchRIURL having a best quality and reliability (for example, an address of the RI servicing at higher data rate or a superior capability) can be selected. For this purpose, the mobile terminal 200 manages the BatchRIURLs or equivalent information of the content objects in the form of a list or a database.

The BatchRIURL field can be added within the common header of the DCF structure as a mandatory field or included in an extended header field, which is mandatory field, located in the common header.

Also, the mobile terminal 200 may select an RI for acquiring ROs of the DRM content objects in a composite manner with reference to the RI URLs stored in the memory unit 208 and send an ROAP Trigger Request message including the selected RI URL. Also, the mobile terminal 200 may request an RI URL for receiving ROs of the DRM content objects to the RI 250 and send an ROAP Trigger Request message to the RI URL received from the RI 250. The RI URL received from the RI 250 is typically stored within the memory unit 208 and uses for acquiring the ROs in a composite manner later.

In response to the ROAP Trigger Request message, the RI 250 generates a ROAP Trigger message and sends the ROAP Trigger message to the mobile terminal 200 (S920). The ROAP Trigger message may include price information on the ROs of the content objects indicated by the ROAP Trigger Request message. Also, the ROAP Trigger message may include one or more roIDs to identify the ROs corresponding to the content objects. The ROAP trigger message may include at least one of roapURL, RI ID, RI Alias, Domain ID, Domain Alias, and Nonce.

The ROAP Trigger request message and ROAP Trigger message can be sent in the form a HTTP GET or a HTTP POST (see RO acquisition mechanism of OMA DRM v2.0). In a multiple RO acquisition method for acquiring multiple ROs simultaneously, the message length may increase, whereby HTTP POST prefers to send the ROAP messages.

In addition, the mobile terminal 200 may display the price information on the screen for user reference.

If the RO Trigger message is received, the mobile terminal 200 generates an RO Request message for requesting one or more ROs corresponding to the DRM content objects and sends the RO Request message to the RI 250 (S930). The ROs may be identical with those indicated in the RO Trigger Request message or may not be identical with those indicated in the RO trigger Request message. That is, the DRM content objects for which ROs are to be acquired may be changed by the user.

If the RO Request message is received, the RI 250 generates an RO Response message containing the ROs indicated in the RO Request message and sends the RO Response to the mobile terminal (S940).

Consequently, the mobile terminal 200 can acquire the ROs by extracting the ROs contained in the RO Response message in a batch processing manner.

The procedure (S910 to S940) can be applied in an abnormal situation. For example, if the DCF of FIG. 13 includes an abnormal header such as a Silent header, or a Preview header for carrying free contents without user interaction for payment and purchase approval, the RO acquisition procedure S910 to S940 may be progressed as a background operation under the negotiation between the mobile terminal 200 and RI 250. In this case, address information for acquiring a multiple of ROs such as a silent group URL (silent-group-url) may included in the abnormal header such that the mobile terminal 200 can access to the RI with reference to the silent group URL to acquire the DCF files, i.e. the ROs of the DRM content objects.

For the background execution of the RO acquisition procedure, permissions, constraints, and purchase information are selectively included in the DCF structure in addition to the silent header. The permissions may include at least one of "play", "display", "execute", "print", and "export" permissions. The constraints may include at least one of "count", "timed-count", "datetime", "interval", "individual", and "system". The constraints are dependent on the individual permissions. The purchase information may include prices of the content objects and contract policies such as a fixed charge system and a metering-based charge system.

The silent group URL, permissions, constraints, and purchase information can be included in additional parts for allowing the user to the parameters therein, or in mandatory parts for protecting the parameters from being tampered. The RO Response message may further include a Session ID for establishing a session between the mobile terminal 200 and the RI 250.

FIG. 10 is a message flow diagram illustrating a right object acquisition method according to another exemplary embodiment of the present invention.

Referring to FIG. 10, if an RO acquisition command is input for acquiring ROs corresponding to one or more DRM content object, the mobile terminal 200 generates an ROAP Trigger Request message and sends the ROAP Trigger Request message to the RI 250 (S1010).

The ROAP Trigger Request message includes one or more DRM content identifiers (CIDs). Also, the ROAP Trigger Request message also includes at least one of the device identifier (DeID) of the mobile terminal 200 and constraints for restricting the usage rights of the selected content objects. The DRM content objects are either the content objects received from another mobile terminal or downloaded from a server or the content objects of which right objects has expired or are close to expires.

Here, the mobile terminal 200 selects an RI for purchasing the ROs corresponding to the DRM content objects with reference to the RI URL information and sends the ROAP Trigger Request message to the selected RI.

If the ROAP Trigger Request message is received, the RI 250 generates an ROAP Trigger message and sends the ROAP Trigger message to the mobile terminal 200. The ROAP Trigger message includes the price information on the ROs corresponding to the content objects indicated by the ROAP Trigger Request message. The ROAP Trigger message further includes roIDs assigned to the individual ROs. The ROAP Trigger message further includes at least one of RI ID, RI Alias, Domain ID, Domain Alias, and Nonce.

If the RO Trigger message is received, the mobile terminal 200 generates an RO Request message for requesting one or more ROs corresponding to the DRM content objects and sends the RO Request message to the RI 250 (S1030).

In response to the RO Request message, the RI 250 generates an RO Response message containing the ROs indicated in the RO Request message and sends the RO Response to the mobile terminal (S1040). The RO Response message may include a session ID.

If the RO Response message is received, the mobile terminal 200 extracts the ROs from the RO Response message. In a case that a session ID is included in the RO response message, the mobile terminal 200 establishes a session with the RI 250 on the basis of the session ID and sends a RO Confirm Request message to the RI 250 through the session (S5050). Since the RO Confirm Request message includes a parameter such as "RO Confirm Info", the RI 250 is acknowledged the successful RO acquisition.

Upon receiving the RO Confirm Request message, the RI 250 checks that the requested ROs are successfully issued and determines whether to end the session or resend the RO Response message. If the parameter "RO Confirm Info" is included in the RO Confirm Request message, the RI 250 determines that the ROs are successfully issued and thus send an RO Confirm Response message to the mobile terminal 200.

The RO acquisition method of the present invention can be implemented without BatchRIURL in the DCF structure.

Figure 12:
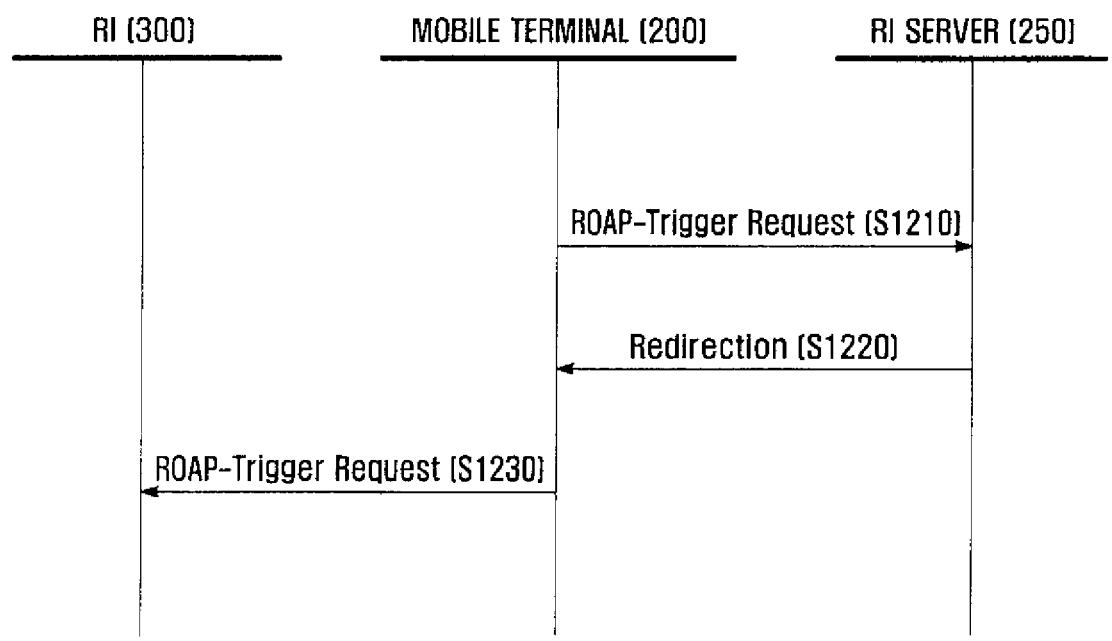
FIG. 12 is a message flow diagram illustrating an exemplary rights object acquisition method according to another exemplary embodiment of the present invention.

FIG. 12 is a message flow diagram illustrating a rights object acquisition method according to another exemplary embodiment of the present invention. In this embodiment, the DRM content object is contained with individual RI URLs rather than BatchRIURL in the DCF.

Referring to FIG. 12, if a multiple RO acquisition command is input by the terminal user, the mobile terminal 200 generates a ROAP Trigger Request message containing CIDs of individual DRM content objects and sends the ROAP Trigger Request message to the RI 250. Here, the mobile terminal 200 sends the ROAP Trigger Request message to the RI 205 with reference to an RI URL of one of multiple DRM content objects.

If the RI 250 received the ROAP Trigger Request message has no multiple RO transmission capability, the RI 250 sends a Redirection message notifying a new URL of another RI, which has the multiple RO transmission capability, to the mobile terminal 200 (S1220). The redirection message can be one, for example, of HTTP 302, HTTP 303, and HTTP 307 messages proposed in OMA DRM.

If the Redirection message is received, the mobile terminal 200 sends the ROAP Trigger Request message to the RI 300 indicated by the RI URL contained in the Redirection message (S1230). Accordingly, the mobile terminal 200 acquires the ROs from the RI 300 through the procedure of FIG. 9 or FIG. 10.

As described above, the ROAP Trigger Request message and ROAP Trigger message can be exchanged in the form of HTTP GET or HTTP POST message. Also, the ROAP Trigger Request message and ROAP Trigger message can be exchanged in the format, i.e., HTTP GET or HTTP POST, designated by the RI.

Figure 14:
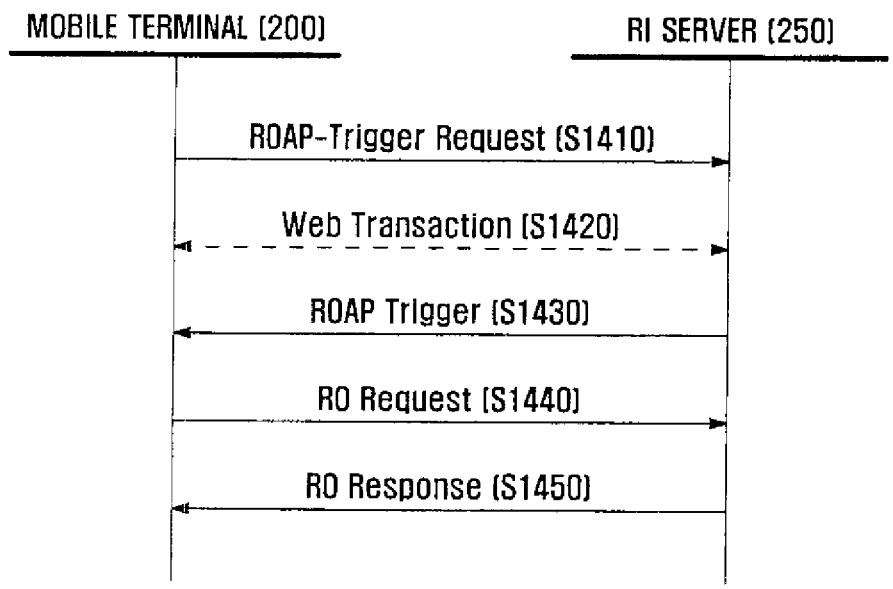
FIG. 14 is a message flow diagram illustrating an exemplary rights object acquisition method according to another exemplary embodiment of the present invention.

FIG. 14 is a message flow diagram illustrating a rights object acquisition method according to another exemplary embodiment of the present invention.

Referring to FIG. 14, the if a multiple RO acquisition command is input by the user, the mobile terminal 200 generates a ROAP Trigger Request message containing a CIDs of individual DRM content objects and sends the ROAP Trigger Request message to the RI 250.

After transmitting the ROAP Trigger Request message, the mobile terminal 200 and RI 250 initiate a web transaction. At this time, the user can configure the permissions of ROs corresponding to the content objects together with constraints. For example, if the RI 250 publishes prices of the ROs associated with the content objects, the mobile terminal 200 generates acquisition request information on the ROs approved by the user and sends the acquisition request information to the RI 250.

After the web transaction has completed by user's approval, the RI 250 generates an ROAP Trigger message associated with the ROs to be acquired and sends the ROAP Trigger message to the mobile terminal 200 (S1430).

If the ROAP Trigger message is received, the mobile terminal 200 generates an RO Request message for acquiring the ROs and sends the RO Request message to the RI 250 (S1440).

Upon receiving the RO Request message, the RI 250 then issues the ROs indicated by the RO Request message and sends a RO Response message containing the ROs to the mobile terminal 200.

Consequently, the mobile terminal 200 acquires the ROs from the RO Response message in a composite manner.

Although the web transaction is performed after the ROAP Trigger Request message is transmitted to the RI 250, it is obvious to those of ordinary skill in the art that the web transaction can be performed at any timing and multiple times. For example, the web transaction can be performed prior to the transmission of the ROAP Trigger Request message. In this case, the user may complete all the manipulations required for payment during the web transaction. Also, the web transaction can be initiated one or more times before and after the transmission of the ROAP Trigger Request message for changing the payment conditions.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the rights object acquisition method and apparatus of the present invention enables acquiring multiple rights objects in a composite manner, thereby improving user convenience. Also, the rights object acquisition method of the present invention can be associated with discount policy for bundle purchase of the content providers, thereby promoting sales in view of the content provider and reducing purchase cost in view of the consumer. Also, the rights object acquisition method of the present invention provides an improved DCF structure enabling acquisition of multiple rights objects in a composite manner, resulting in improvement of DRM technology.

What is claimed is:

1. A rights object providing method, comprising:
generating, if multiple rights objects (ROs) corresponding to a plurality of individual contents are requested, a common rights object acquisition request containing a plurality of content identifiers (CIDs) assigned to said individual contents;
sending the common rights object acquisition request from a mobile terminal to a rights issuer; and
transmitting a common rights object acquisition response containing a plurality of rights object identifiers (roIDs) assigned to the plurality of individual contents from the rights issuer to the mobile terminal,
wherein the multiple rights objects are requested and acquired as a composite via a common rights issuer address from which acquirable ROs exist, wherein the common rights issuer address comprises BatchRIURL addresses for each of the multiple ROs included in the content of one of the multiple ROs, and wherein a digital rights management content format (DCF) structure is modified to utilize an additional field dedicated to indicate the address for acquiring multiple ROs in a composite manner.

2. The rights object providing method of claim 1, wherein the common rights object acquisition request comprises a common BatchRIURL header indicating an address of the rights issuer.

3. The rights object providing method of claim 1, wherein at least one of the common rights object acquisition request and the common rights object acquisition response is transmitted in an HTTP GET or HTTP POST message.

4. The rights object providing method of claim 1, wherein the common rights object acquisition request is transmitted to the rights issuer indicated by a common rights issuer address shared by the plurality of individual contents or a previously registered rights issuer address.

5. The rights object providing method of claim 4, wherein the common rights issuer address is extracted from headers of the individual contents.

6. The rights object providing method of claim 5, wherein the headers comprise a common header indicating the common rights issuer address.

7. The rights object providing method of claim 4, further comprising:
   acquiring an address of the rights issuer having a multiple rights object issuance capability; and
   sending the common rights object acquisition request to a rights object issuer having the multiple rights object issuance capability.

8. A rights object acquisition method of a mobile terminal, comprising:
   transmitting a request for a rights object acquisition protocol (ROAP) trigger referencing multiple contents to a rights issuer;
   receiving the ROAP trigger from the rights issuer in response to the request for the ROAP trigger;
   transmitting a rights object (RO) request referencing the multiple contents to the rights issuer after receiving the ROAP trigger;
   receiving an RO response from the rights issuer in response to the RO request; and
   acquiring at least one RO corresponding to the multiple contents from the RO response;
   wherein the multiple contents are requested and acquired as a composite via a common rights issuer address from which acquirable ROs exist, wherein the common rights issuer address comprises BatchRIURL addresses for each of the ROs included in the content of one of the ROs; and
   wherein a digital rights management content format (DCF) structure is modified to utilize an additional field dedicated to indicate the address for acquiring ROs in a composite manner.

9. The rights object acquisition method of claim 8, wherein the ROAP trigger request comprises a common headers field indicating a uniform resource locator (common BatchRIURL) of the rights issuer.

10. The rights object acquisition method of claim 8, wherein the ROAP trigger request comprises a plurality of content identifiers (CIDs) individually assigned to the multiple contents.

11. The rights object acquisition method of claim 8, wherein the ROAP trigger comprises a plurality of RO identifiers (roIDs) assigned to the ROs corresponding to the multiple contents.

12. The rights object acquisition method of claim 11, wherein the RO request comprises at least one RO identifier of the RO corresponding to the at least one content.

13. The rights object acquisition method of claim 12, wherein the RO response comprises at least one RO corresponding to the at least one content.

14. The rights object acquisition method of claim 8, wherein transmitting the RO request comprises:
   extracting pricing information on the ROs corresponding to the multiple contents from the ROAP trigger; and
   generating, in response to a user approval command, the RO request referencing RO identifiers of the ROs corresponding to the multiple contents.

15. The rights object acquisition method of claim 8, wherein transmitting an RO request comprises:
   extracting the pricing information on the ROs corresponding to the multiple contents from the ROAP trigger; and
   generating, in response to a user selection command, the RO request referencing at least one RO identifier of the RO corresponding to the at least one content.

16. A rights object acquisition method of a mobile terminal in digital right management (DRM) system, comprising
   transmitting to a rights issuer (RI), if multiple rights objects (RO) corresponding to multiple DRM contents are requested, a request for a rights object acquisition (ROAP) trigger referencing a plurality of content identifiers (CIDs) assigned to the multiple DRM contents;
   receiving by the RI the requested ROAP trigger referencing a plurality of RO identifiers (roIDs) assigned to the ROs corresponding to the multiple DRM contents from the RI in response to the transmitted request for the ROAP trigger;
   transmitting to the RI an RO request referencing multiple DRM contents selected by a user after receiving the requested ROAP trigger;
   receiving an RO response containing at least one RO corresponding to the multiple DRM contents from the RI; and
   acquiring the at least one RO for the multiple DRM contents from the RO response
   wherein the multiple DRM contents are requested and acquired as a composite via a common rights issuer address from which acquirable ROs exist, wherein the common rights issuer address comprises BatchRIURL addresses for each of the multiple ROs included in the content of one of the multiple ROs; and
   wherein a digital rights management content format (DCF) structure is modified to utilize an additional field dedicated to indicate the address for acquiring multiple ROs in a composite manner.

17. The rights object acquisition method of claim 16, wherein the ROAP trigger request and ROAP trigger are transmitted in a hypertext transport protocol (HTTP) GET or HTTP POST message.

18. The rights object acquisition method of claim 16, wherein the RI is determined on the basis of a common RI address shared by the multiple DRM contents or a previously-registered RI address.

19. The rights object acquisition method of claim 18, wherein the common RI address is obtained from headers of the multiple DRM contents.

20. The rights object acquisition method of claim 19, wherein the headers comprises a common uniform resource locator (common BatchRIURL) header indicating the common RI address.

21. The rights object acquisition method of claim 16, wherein transmitting the ROAP trigger request comprises:
   transmitting the ROAP trigger request to the RI with reference to a RI address attached to at least one of the multiple DRM contents;
   receiving a redirection message including a new RI URL; and
   transmitting the ROAP trigger request to a new RI with reference to the new RI URL.

22. The rights object acquisition method of claim 16, wherein transmitting the ROAP trigger request comprises:
   requesting an address of the multiple RO-issuable RI to a specific RI;
   receiving an address of the multiple RO-issuable RI from the specific RI; and
   transmitting the ROAP trigger request to the multiple RO-issuable RI.

23. The rights object acquisition method of claim 16, further comprising configuring permissions and constraints of ROs corresponding to the multiple DRM contents after transmitting the ROAP trigger request.

24. The rights object acquisition method of claim 16, wherein the multiple DRM contents are referenced by information contained in a DRM content format (DCF) through a background operation.

25. The rights object acquisition method of claim 24, wherein the information comprises one of a silent header or a preview header.

26. The rights object acquisition method of claim 25, wherein each of the silent and preview headers comprises address information for acquiring at least one RO corresponding to at least one DRM content in a composite mariner.

27. The rights object acquisition method of claim 25, wherein the information comprises the silent header and includes address information for acquiring at least one RO corresponding to at least one DRM content in a composite manner.

28. The rights object acquisition method of claim 25, wherein the information comprises the preview header and includes address information for acquiring at least one RO corresponding to at least one DRM content in a composite manner.

29. The rights object acquisition method of claim 20, wherein the ROAP trigger request comprises at least one parent constraint representing one or more child constraints restricting ROs on a DRM content.

30. A rights object acquisition method of a mobile terminal in a digital rights management (DRM) system, comprising:
generating, if multiple rights objects corresponding to at least one DRM content are requested, a rights object acquisition protocol (ROAP) trigger request;
checking a common header of a DRM content format (DCF) containing at least one DRM content;
selecting a rights issuer (RI) for acquiring rights objects (ROs) corresponding to at least one DRM content with reference to the common header; and
transmitting the ROAP trigger request to the RI,
wherein the multiple rights objects are requested and acquired as a composite via a common rights issuer address from which acquirable ROs exist, wherein the common rights issuer address comprises BatchRIURL addresses for each of the ROs included in the content of one of the ROs; and
wherein a digital rights management content format (DCF) structure is modified to utilize an additional field dedicated to indicate the address for acquiring ROs in a composite manner.

31. The rights object acquisition method of claim 30, wherein the common header comprises a common uniform resource locator (common BatchRIURL) header indicating an address of the RI, the common header being located in a specific field of the DCF.

32. The rights object acquisition method of claim 30, wherein the ROAP trigger request is transmitted in the form of a HTTP GET message or HTTP POST message.

33. The rights object acquisition method of claim 30, wherein the ROAP trigger request comprises at least one content identifier (OD) corresponding to the at least one DRM content.

34. The rights object acquisition method of claim 30, wherein the ROAP trigger request comprises at least one parent license indicator grouping one or more child license indicators assigned to ROs corresponding to a specific DRM content.

35. A rights object acquisition method for a digital rights management (DRM) system including a rights issuer (RI) issuing rights objects (ROs) to a mobile terminal, comprising:
receiving, at the RI, a rights object acquisition protocol (ROAP) trigger request referencing a plurality of content identifiers (CIDs) assigned to a plurality of contents from the mobile terminal;
generating ROAP trigger referencing a plurality of rights object identifiers (roIDs) assigned to the ROs corresponding to the contents; and
transmitting the ROAP trigger to the mobile terminal,
wherein the rights objects are acquired and requested as a composite via a common rights issuer address from which acquirable ROs exist, wherein the common rights issuer address comprises BatchRIURL addresses for each of the ROs included in the content of one of the ROs; and
wherein a digital rights management content format (DCF) structure is modified to utilize an additional field dedicated to indicate the address for acquiring ROs in a composite manner.

36. The rights object acquisition method of claim 35, wherein the ROAP trigger is transmitted using a hypertext transport protocol (HTTP) GET message or HTTP POST message.

37. A rights object acquisition method of a mobile terminal, comprising:
generating, if multiple rights objects corresponding to a plurality of contents are requested, a rights object acquisition protocol (ROAP) trigger request referencing a plurality of contents identifiers (CIDs) assigned to the plurality of contents;
transmitting the ROAP trigger request to a rights issuer (RI) located by common uniform resource locator (common BatchRIURL) headers of the contents;
receiving a ROAP trigger referencing a plurality of rights object identifiers (roIDs) assigned to rights objects corresponding to the contents from the RI; and
acquiring at least one RO corresponding to at least one content with reference to the roIDs in a composite manner; and
wherein the rights objects are acquired as a bundle from a common rights issuer address from which acquirable ROs exist, wherein the common rights issuer address comprises BatchRIURL addresses for each of the multiple ROs included in the content of one of the multiple ROs; and
wherein a digital rights management content format (DCF) structure is modified to utilize an additional field dedicated to indicate the address for acquiring multiple ROs in a composite manner.

38. The rights object acquisition method of claim 37, wherein the common BatchRIURL header comprises an address of the RI having a multiple rights object issuance capability, the common BatchRIURL header being located in a specific field of the DCF.

39. The rights object acquisition method of claim 37, wherein the ROAP trigger request and ROAP trigger is transmitted using a hypertext transport protocol (HTTP) GET message or HTTP POST message.

40. The rights object acquisition method of claim 37, wherein the ROAP trigger request comprises at least one parent license indicator grouping one or more child license indicators assigned to ROs corresponding to a specific DRM content.

41. The rights object acquisition method of claim 40, wherein the ROAP trigger request comprises at least one parent constraint representing at least two child constraints ROs on a DRM content.

42. The rights object acquisition method of claim 37, wherein acquiring at least one RO comprises:
   transmitting an RO request referencing at least one roID to the RI;
   receiving an RO response for issuing the ROs indicated by the at least one roID from the RI; and
   extracting the RO from the RO response.

43. The rights object acquisition method of claim 42, wherein the at least one roID is selected from the roIDs contained in the ROAP response.

44. The rights object acquisition method of claim 42, wherein the RO response contains at least one RO corresponding to the at least one content.

45. A rights object providing method, comprising:
   generating, if multiple rights objects (ROs) corresponding to a plurality of individual contents are requested, a common rights object acquisition request containing a plurality of content identifiers (CIDs) assigned to said individual contents;
   receiving the common rights object acquisition request from a mobile terminal by a rights issuer; and
   transmitting a common rights object acquisition response containing a plurality of rights object identifiers (roIDs) assigned to the plurality of individual contents from the rights issuer to the mobile terminal;
   wherein the multiple rights objects are acquired as a composite, and
   wherein the common rights object acquisition request is transmitted to the rights issuer indicated by a common rights issuer address shared by the plurality of individual contents or a previously registered rights issuer address, wherein the common rights issuer address comprises BatchRIURL addresses for each of the multiple ROs included in the content of one of the multiple ROs; and
   wherein a digital rights management content format (DCF) structure is modified to utilize an additional field dedicated to indicate the address for acquiring multiple ROs in a composite manner.

46. The rights object providing method of claim 45, wherein the common rights object acquisition request comprises a common BatchRIURL header indicating an address of the rights issuer.

47. The rights object providing method of claim 45, wherein at least one of the common rights object acquisition request and the common rights object acquisition response is transmitted in an HTTP GET or HTTP POST message.

48. The rights object providing method of claim 45, wherein the common rights issuer address is extracted from headers of the individual contents.

49. The rights object providing method of claim 48, wherein the headers comprise a common header indicating the common rights issuer address.

50. The rights object providing method of claim 45, further comprising:
   acquiring an address of the rights issuer having the multiple rights issuance capability; and
   sending the common rights object acquisition request to the rights object issuer having the multiple rights object issuance capability.

* * * * *

UNITED STATES PATENT AND TRADEMARK OFFICE
CERTIFICATE OF CORRECTION

PATENT NO. : 8,627,338 B2  
APPLICATION NO. : 12/014148  
DATED : January 7, 2014  
INVENTOR(S) : Kyung Keun et al.

Page 1 of 1

It is certified that error appears in the above-identified patent and that said Letters Patent is hereby corrected as shown below:

In the Claims

Column 21, Claim 26, Line 15 should read as follows:  
--...in a composite manner...--

Column 21, Claim 33, Line 61 should read as follows:  
--...content identifier (CID) corresponding...--

Signed and Sealed this  
Sixth Day of May, 2014

Michelle K. Lee  
*Deputy Director of the United States Patent and Trademark Office*